United States Patent
Kaino

(10) Patent No.: US 10,718,864 B2
(45) Date of Patent: Jul. 21, 2020

(54) RADAR DEVICE AND INFORMATION TRANSFER METHOD

(71) Applicant: FUJITSU TEN LIMITED, Kobe-shi, Hyogo (JP)

(72) Inventor: Shozo Kaino, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 308 days.

(21) Appl. No.: 15/616,065

(22) Filed: Jun. 7, 2017

(65) Prior Publication Data

US 2017/0363737 A1 Dec. 21, 2017

(30) Foreign Application Priority Data

Jun. 17, 2016 (JP) .................. 2016-121296
Apr. 21, 2017 (JP) .................. 2017-084797

(51) Int. Cl.
*G01S 13/931* (2020.01)
*G01S 13/42* (2006.01)
*G01S 7/35* (2006.01)
*G01S 13/34* (2006.01)
*G01S 13/88* (2006.01)
*G01S 7/00* (2006.01)
*G01S 13/44* (2006.01)

(52) U.S. Cl.
CPC ............ *G01S 13/931* (2013.01); *G01S 7/354* (2013.01); *G01S 13/345* (2013.01); *G01S 13/42* (2013.01); *G01S 13/88* (2013.01); *G01S 7/003* (2013.01); *G01S 13/4454* (2013.01)

(58) Field of Classification Search
CPC ........ G01S 13/931; G01S 13/42; G01S 7/354; G01S 13/88; G01S 13/345; G01S 13/4454; G01S 7/003

USPC ............................................................ 342/70
See application file for complete search history.

(56) References Cited

U.S. PATENT DOCUMENTS

| | | | |
|---|---|---|---|
| 6,337,638 B1* | 1/2002 | Bates | B60K 31/0008 340/435 |
| 2012/0101711 A1* | 4/2012 | Furmston | G01S 7/415 701/300 |
| 2014/0118186 A1* | 5/2014 | Nakanishi | G01S 13/42 342/128 |
| 2016/0019700 A1* | 1/2016 | Maggio | G06T 7/20 382/103 |
| 2017/0328988 A1* | 11/2017 | Magee | G01S 7/4815 |

FOREIGN PATENT DOCUMENTS

| | | |
|---|---|---|
| JP | 2007-279892 A | 10/2007 |
| JP | 2012-163442 A | 8/2012 |
| JP | 2016-006383 A | 1/2016 |

* cited by examiner

*Primary Examiner* — Frank J McGue
(74) *Attorney, Agent, or Firm* — Oliff PLC

(57) ABSTRACT

A radar device includes a signal processing unit and a target information output unit. The target information output unit outputs only pair data having addition reliability equal to or larger than a threshold to the outside of the radar device as target information. The signal processing unit determines whether a first target and a second target belong to the same object. The first target is pair data derived later than the second target. If it is determined that the first target and the second target belong to the same object, the signal processing unit transfers reliability of the second target to the first target.

19 Claims, 16 Drawing Sheets

FIG.19

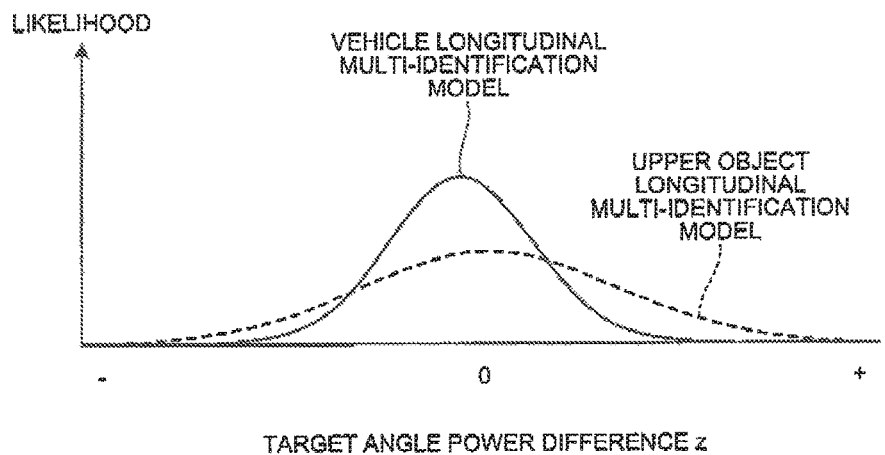

FIG.20

| FACTOR OF EXTRAPOLATION PROCESSING | | VEHICLE LONGITUDINAL MULTI-IDENTIFICATION LIKELIHOOD | UPPER OBJECT LONGITUDINAL MULTI-IDENTIFICATION LIKELIHOOD | SCORE |
|---|---|---|---|---|
| FACTOR 1 | PEAK OF TARGET P1 IS WITHIN PREDICTED RANGE OF TARGET P2 IN BOTH OF UP/DOWN ZONES | HIGH | LOW | POSITIVE VALUE |
| FACTOR 2 | PEAK OF TARGET P1 IS OUTSIDE PREDICTED RANGE OF TARGET P2 IN BOTH OF UP/DOWN ZONES | MIDDLE | HIGH | NEGATIVE VALUE |
| FACTOR 3 | PEAK OF TARGET P1 IS WITHIN PREDICTED RANGE OF TARGET P2 IN ONE OF UP/DOWN ZONES, AND IS OUTSIDE PREDICTED RANGE IN OTHER ONE OF UP/DOWN ZONES | MIDDLE | VERY LOW | POSITIVE VALUE |
| FACTOR 4 | EXTRAPOLATION PROCESSING IN ONE OF UP/DOWN ZONES (ONE-SIDE EXTRAPOLATION PROCESSING) | HIGH | HIGH | 0 |
| FACTOR 5 | OTHERS | LOW | MIDDLE | NEGATIVE VALUE |

RADAR DEVICE AND INFORMATION TRANSFER METHOD

CROSS-REFERENCE TO RELATED APPLICATIONS

This application is based upon and claims the benefit of priority of the prior Japanese Patent Application No. 2016-121296, filed on Jun. 17, 2016; and Japanese Patent Application No. 2017-084797, filed on Apr. 21, 2017, the entire contents of both of which are incorporated herein by reference.

FIELD

The embodiments discussed herein are directed to a radar device and an information transfer method.

BACKGROUND

A radar device detects a target related to an object by receiving a reception signal obtained when a transmission signal transmitted from the radar device is reflected by the object (for example, see Japanese Laid-open Patent Publication No. 2016-006383).

Examples of the radar device include a millimetric wave radar. The radar device is, for example, mounted on a vehicle, and detects a target related to an object that is present in the periphery of the vehicle by using a frequency modulated continuous wave (FM-CW).

The object to be detected by the radar device mounted on the vehicle is, for example, divided broadly into a stationary object and a moving object. Examples of the stationary object include a traffic light, a pole, a pedestrian bridge, a utility pole, a traffic sign, a guardrail, and a road guide plate placed on a road surface, a side strip, a footpath, and the like. Examples of the moving object include another vehicle (hereinafter, also referred to as "leading vehicle" in some cases) traveling in front of an own vehicle toward the same direction as the own vehicle.

The radar device mounted on the vehicle calculates "reliability" of the target as data related to classification of each target. Examples of the target having relatively low reliability include a target related to a stationary object (hereinafter, also referred to as "upper object" in some cases) placed at a position that is higher, by a predetermined distance, than a height of the vehicle on which the radar device is mounted, and a target related to a stationary object (hereinafter, also referred to as "lower object" in some cases) placed at a position lower than the bottom of the vehicle on which the radar device is mounted. Examples of the upper object include a pedestrian bridge and a road guide plate, and examples of the lower object include a road rivet arranged at a median strip or a curve of a road. Examples of the target having relatively high reliability include a target related to a vehicle (hereinafter, also referred to as "standing vehicle" in some cases) being stopped in its own lane, and a target related to a leading vehicle. The radar device outputs information about a target having reliability equal to or larger than a threshold to a vehicle control device that controls behavior of the vehicle, and does not output information about a target having reliability smaller than a threshold to the vehicle control device.

When the radar device detects a target related to a standing vehicle the total length of which is relatively long (for example, a truck), a transmission wave may be reflected at a plurality of points on the standing vehicle. In this case, a plurality of reflected waves arrives at the radar device from one standing vehicle. For example, a reception signal R1 is received by the radar device when the transmission wave is reflected at a position of a rear bumper arranged at a rear end of the standing vehicle, and a reception signal R2 is received by the radar device when the transmission wave is reflected at a position of a side mirror arranged in the vicinity of a driver's seat at the front part of the truck. When the reception signal R1 and the reception signal R2 are received from one standing vehicle, the radar device detects two targets, that is, a target P1 related to a reflection point of the rear bumper and a target P2 related to a reflection point of the side mirror. A case in which a plurality of targets is detected for one object as described above may be referred to as a "longitudinal multi-identification". Hereinafter, an object for which the longitudinal multi-identification is caused may be referred to as a "longitudinal multi-identification object".

On the other hand, a vehicle control device often uses a target related to the rear end (for example, the rear bumper) of the standing vehicle as a reference point for vehicle control. For example, an advanced emergency braking system (AEBS) serving as a vehicle control device causes a brake of the own vehicle to operate to prevent collision with the standing vehicle when a distance between the own vehicle and the rear end of the standing vehicle becomes smaller than a threshold.

However, the reflected waves from the standing vehicle include not only a direct wave that is directly received from the reflection point by the radar device but also a multipath wave that is indirectly received from the reflection point by the radar device after being reflected by the ground. In some cases, the multipath wave from a portion other than the rear end of the standing vehicle interferes with the direct wave from the rear bumper, and the target P1 is unable to be detected because power of the reception signal R1 is lowered.

When the target P2 is detected while power of the reception signal R2 is not interfered with by the multipath wave, the radar device detects the target P2 related to the side mirror earlier than the target P1 related to the rear bumper of the standing vehicle. As a result, the position of the target P2 is detected as the position of the standing vehicle, and determination processing of classification of the target P1 is delayed, the target P1 being used as the reference point of the vehicle control device. When the determination processing of classification of the target is delayed in the radar device as described above, processing of determining whether a target of interest is a target that needs vehicle control is delayed in the vehicle control device. As a result, if the target of interest is the target that needs vehicle control, vehicle control (for example, start of braking of the vehicle by the AEBS) is delayed.

SUMMARY

A radar device according to an aspect of an embodiment includes a determination unit, a transfer unit. The radar device derives information related to a target based on a reception signal that is acquired by receiving a reflected wave obtained when a transmission wave transmitted to a periphery of an own vehicle is reflected by an object present in the periphery. The determination unit determines whether a plurality of targets belongs to a same object. The transfer unit transfers, when it is determined that the plurality of targets belongs to the same object, information related to a classification of a second target as information related to a classification of a first target among the plurality of targets when the first target is a target present at a closer position than the second target and the second target is a target derived earlier than the first target.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein

FIGS. 19 and 20 are diagrams for explaining an operation example of the signal processing unit according to the second embodiment;

DESCRIPTION OF EMBODIMENTS

Figure 1:
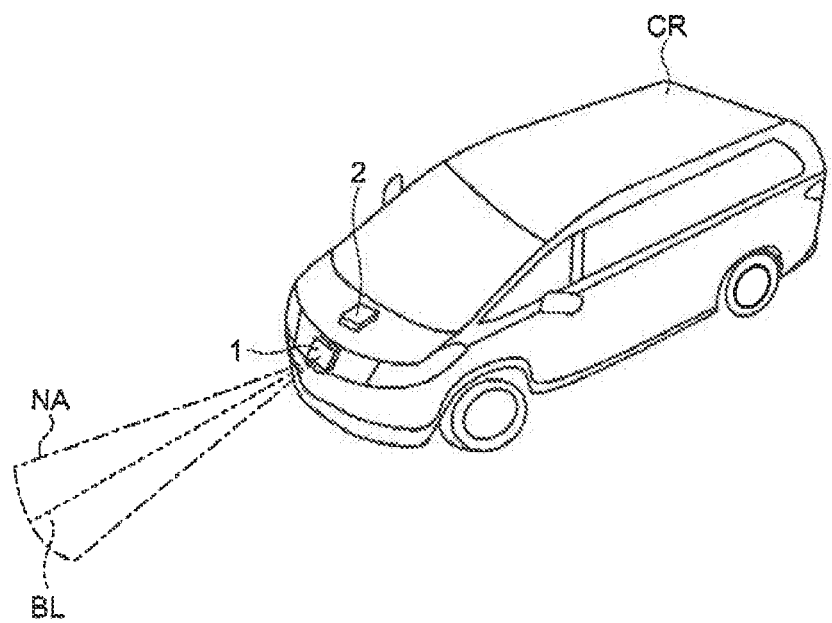
FIG. 1 is a diagram illustrating an example of a vehicle on which a vehicle control system according to a first embodiment is mounted.

A radar device disclosed herein transmits a transmission signal the transmission frequency of which is changed at predetermined cycles, and receives a reception signal obtained when the transmission signal is reflected by an object. The radar device disclosed herein acquires a peak of a frequency spectrum of a signal (hereinafter, also referred to as a "beat signal" in some cases) indicating a difference frequency (hereinafter, also referred to as a "beat frequency" in some cases) between the transmission frequency of the transmission signal and a reception frequency of the reception signal in a rising zone of the transmission frequency (hereinafter, also referred to as an "UP zone" in some cases) and a lowering zone of the transmission frequency (hereinafter, also referred to as a "DOWN zone" in some cases). The radar device disclosed herein derives information about a target (hereinafter, also referred to as "target information" in some cases) based on data of a pair (association) of a peak in the UP zone (hereinafter, also referred to as an "UP peak" in some cases) and a peak in the DOWN zone (hereinafter, also referred to as a "DOWN peak" in some cases). Such data obtained by associating the UP peak with the DOWN peak is referred to as the "target". One target corresponds to one reflection point of one object.

The following describes embodiments of the radar device and a reliability transfer method disclosed herein based on the drawings. The radar device and the reliability transfer method disclosed herein are not limited to the embodiments. In the following description, a configuration having the same function and a step for performing the same processing are denoted by the same reference numerals in each embodiment.

First Embodiment

Configuration of Vehicle Control System

Figure 2:
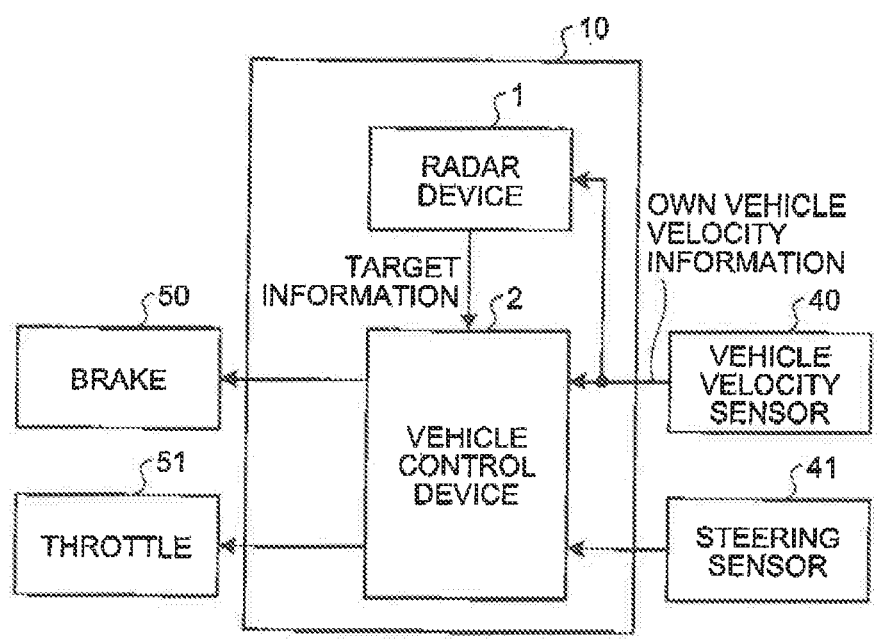
FIG. 2 is a diagram illustrating a configuration example of the vehicle control system according to the first embodiment.

FIG. 1 is a diagram illustrating an example of a vehicle on which a vehicle control system according to a first embodiment is mounted, and FIG. 2 is a diagram illustrating a configuration example of the vehicle control system according to the first embodiment.

In FIG. 1, a vehicle CR includes a radar device 1 and a vehicle control device 2 mounted thereon. As illustrated in FIG. 2, the radar device 1 and the vehicle control device 2 are included in a vehicle control system 10. The vehicle control device 2 is, for example, implemented by an electronic control unit (ECU). In the vehicle CR, for example, the radar device 1 is mounted in the vicinity of a front bumper of the vehicle CR. The radar device 1 transmits, for example, a transmission signal having a beam pattern NA having a central axis BL to scan a predetermined scanning range, and derives a distance in a vehicle traveling direction (hereinafter, also referred to as a "longitudinal distance" in some cases) and a distance in a vehicle horizontal direction (vehicle-width direction) (hereinafter, also referred to as a "transverse distance" in some cases) between the vehicle CR and the target to derive positional information of the target with respect to the vehicle CR. The radar device 1 also derives a velocity of the target (hereinafter, also referred to as a "relative velocity" in some cases) with respect to a velocity of the vehicle CR (hereinafter, also referred to as an "own vehicle velocity" in some cases).

In FIG. 2, the vehicle control system 10 includes the radar device 1 and the vehicle control device 2. The radar device 1 outputs the target information to the vehicle control device 2. The target information output from the radar device 1 includes the longitudinal distance, the transverse distance, and the relative velocity.

A vehicle velocity sensor 40, a steering sensor 41, a brake 50, and a throttle 51 are connected to the vehicle control device 2. The vehicle velocity sensor 40, the steering sensor 41, the brake 50, and the throttle 51 are mounted on the vehicle CR.

The vehicle velocity sensor 40 detects the own vehicle velocity, and outputs information of the detected own vehicle velocity (hereinafter, also referred to as "own vehicle velocity information" in some cases) to the radar device 1 and the vehicle control device 2. The steering sensor 41 detects a steering angle of the vehicle CR, and outputs information of the detected steering angle to the vehicle control device 2. The brake 50 reduces the own vehicle velocity in accordance with control by the vehicle control device 2. The throttle 51 increases the own vehicle velocity in accordance with control by the vehicle control device 2.

The vehicle control device 2 controls an operation of the brake 50 and an operation of the throttle 51 based on the target information, the own vehicle velocity detected by the vehicle velocity sensor 40, and the steering angle of the vehicle CR detected by the steering sensor 41 to control behavior of the vehicle CR. For example, the vehicle control device 2 controls the brake 50 and the throttle 51 based on the target information, the own vehicle velocity, and the steering angle of the vehicle CR to implement adaptive cruise control (ACC) to cause the vehicle CR to travel following a leading vehicle while keeping a distance constant between the vehicle CR and the leading vehicle. For example, the vehicle control device 2 controls the brake 50 based on the target information, the own vehicle velocity, and the steering angle of the vehicle CR to implement the AEBS to reduce the own vehicle velocity in a case in which there is a risk that the vehicle CR collides against an obstacle.

Configuration of Radar Device

Figure 3:
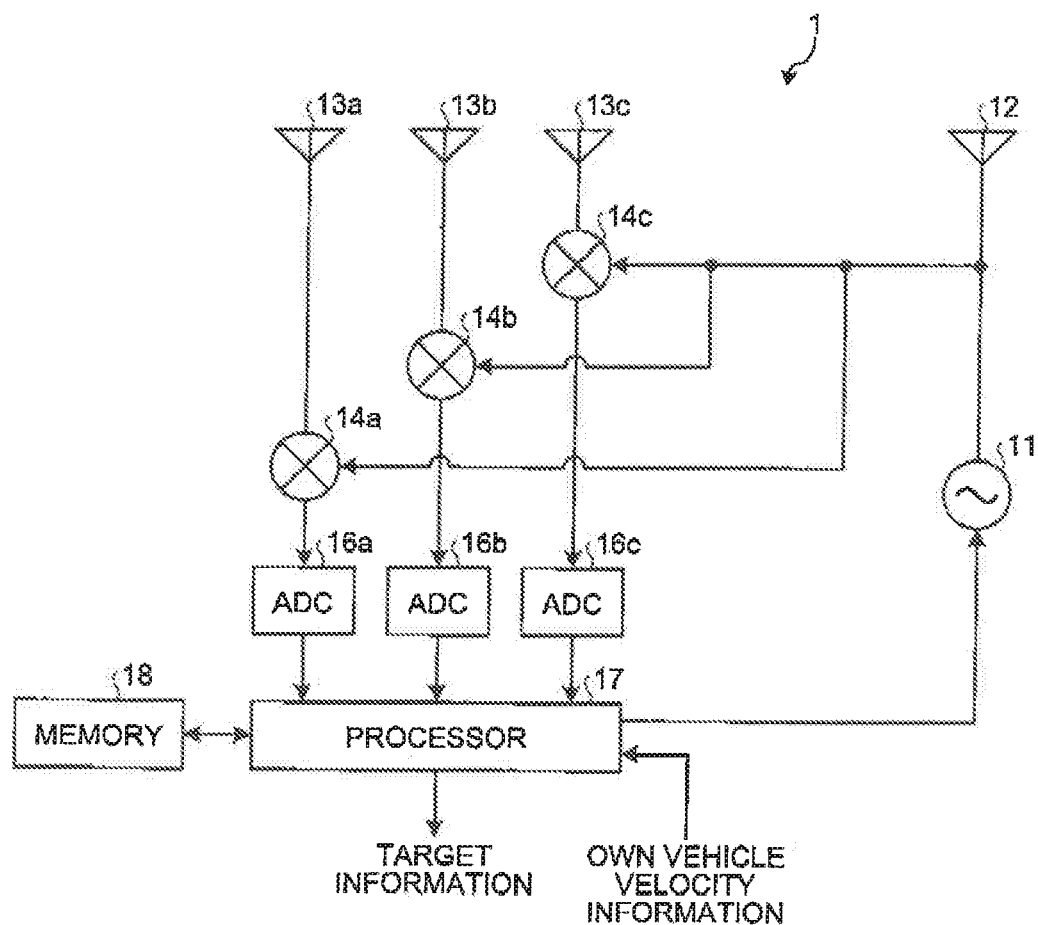
FIG. 3 is a diagram illustrating a configuration example of a radar device according to the first embodiment.

FIG. 3 is a diagram illustrating a configuration example of the radar device according to the first embodiment. In FIG. 3, the radar device 1 includes a processor 17, a memory 18, an oscillator 11, a transmission antenna 12, reception antennas 13a, 13b, and 13c, mixers 14a, 14b, and 14c, analog to digital converters (ADCs) 16a, 16b, and 16c. The processor 17 outputs the target information. The reception antennas 13a, 13b, and 13c are arranged in a line on a straight line at regular intervals to form a reception antenna array. Examples of the processor 17 include a central processing unit (CPU), a digital signal processor (DSP), and a field programmable gate array (FPGA). Examples of the memory 18 include a RAM such as an SDRAM, a ROM, and a flash memory. In the following description, the reception antennas 13a, 13b, and 13c may be collectively referred to as a "reception antenna 13", the mixers 14a, 14b, and 14c may be collectively referred to as a "mixer 14", and ADCs 16a, 16b, and 16c may be collectively referred to as an "ADC 16".

The oscillator 11 frequency-modulates a signal of a continuous wave based on a modulation signal input from the processor 17 to generate a transmission signal the frequency of which is changed with a lapse of time, and outputs the generated transmission signal to the transmission antenna 12 and the mixer 14.

The transmission antenna 12 transmits the transmission signal frequency-modulated by the oscillator 11 as a transmission wave.

The reception antenna 13 receives, as a reception signal, a reflected wave obtained when the transmission signal as the transmission wave is reflected by an object present around the radar device 1, and acquires the reception signal.

The mixer 14 mixes the transmission signal input from the oscillator 11 and the reception signal input from the reception antenna 13. Through the mixing by the mixer 14, a beat signal is generated, the beat signal indicating a beat frequency as a difference frequency between the transmission frequency of the transmission signal and the reception frequency of the reception signal. The mixer 14 outputs, to the ADC 16, the beat signal generated through the mixing.

The ADC 16 converts an analog beat signal into a digital beat signal, and outputs the converted digital beat signal to the processor 17.

Relation between transmission signal and reception signal

Figure 4:
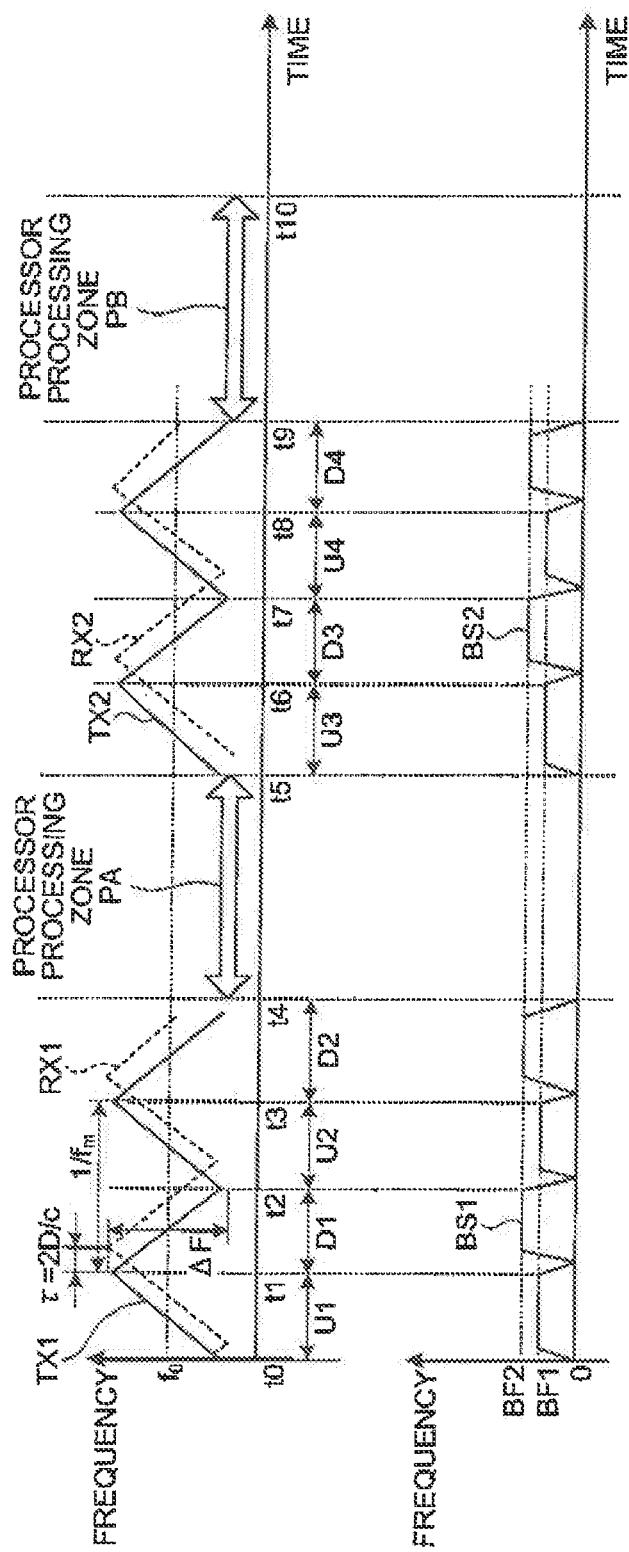
FIG. 4 is a diagram illustrating an example of a relation between a transmission signal and a reception signal according to the first embodiment.

FIG. 4 is a diagram illustrating an example of a relation between the transmission signal and the reception signal according to the first embodiment. The following describes an FM-CW system by way of example. However, a system to which the technique disclosed herein is applied is not limited to the FM-CW system. The technique disclosed herein can be applied to all systems in which the target is detected by using the UP zone in which the transmission frequency of the transmission signal rises and the DOWN zone in which the transmission frequency of the transmission signal lowers.

In the following description, "$f_r$" indicates a distance frequency, "$f_d$" indicates a velocity frequency, "$f_0$" indicates a center frequency of the transmission signal, "$\Delta F$" indicates a frequency shift width, "$f_m$" indicates a repetition frequency of the modulation signal, "c" indicates the velocity of light (velocity of a radio wave), "T" indicates a reciprocating of the radio wave between the radar device 1 and the target, "$f_s$" indicates a transmission/reception frequency, "R" indicates a longitudinal distance, "V" indicates a relative velocity, "$\theta_m$" indicates an angle of the target with respect to the radar device 1, "$\theta_{up}$" is an angle corresponding to the UP peak, "$\theta_{dn}$" indicates an angle corresponding to the DOWN peak, and "D" indicates a distance from the radar device 1 to the target. Hereinafter, transmission signals TX1 and TX2 may be collectively referred to as a "transmission signal "TX"", reception signals RX1 and RX2 may be collectively referred to as a "reception signal RX", and beat signals BS1 and BS2 may be collectively referred to as a "beat signal BS".

In the upper diagram of FIG. 4, from time t0 to time t4, the transmission frequency of the transmission signal TX1 repeatedly rises and lowers at predetermined cycles of "$1/f_m$" such that, assuming that the center frequency is $f_0$, the transmission frequency rises to the upper limit frequency in the UP zone U1 and lowers to the lower limit frequency in the DOWN zone D1, and rises to the upper limit frequency in the UP zone U2 and lowers to the lower limit frequency in the DOWN zone D2. For example, the center frequency $f_0$ is 76.5 GHz, the upper limit frequency is 76.6 GHz, and the lower limit frequency is 76.4 GHz. In this way, a zone combining one UP zone and one DOWN zone is assumed to be one cycle, and the radar device 1 transmits the transmission signal TX corresponding to two cycles in one time of transmission. The reception signal RX1 also repeatedly rises and lowers at predetermined cycles of "$1/f_m$" similarly to the transmission signal TX1, the reception signal RX1 arriving at the radar device 1 to be received by the reception antenna 13 when the transmission signal TX1 transmitted from the transmission antenna 12 is reflected by the object.

Subsequently, in a processor processing zone PA from time t4 to time t5, the processor 17 performs signal processing for deriving the target information using the transmission signal TX1 and the reception signal RX1.

Similarly to the time t0 to the time t4, from the time t5 to the time t9, the transmission frequency of the transmission signal TX2 repeatedly rises and lowers at predetermined cycles of "$1/f_m$" such that, assuming that the center frequency is $f_O$, the transmission frequency rises to the upper limit frequency in the UP zone U3 and lowers to the lower limit frequency in the DOWN zone D3, and rises to the upper limit frequency in the UP zone U4 and lowers to the lower limit frequency in the DOWN zone D4. The reception signal RX2 also repeatedly rises and lowers at predetermined cycles of "$1/f_m$" similarly to the transmission signal TX2, the reception signal RX2 arriving at the radar device 1 to be received by the reception antenna 13 when the transmission signal TX2 transmitted from the transmission antenna 12 is reflected by the object.

In a processor processing zone PB from the time t9 to time t10, the processor 17 performs signal processing for deriving the target information using the transmission signal TX2 and the reception signal RX2.

The same processing as that in the time t0 to the time t10 will be repeated after the time t10. As described above, in the radar device 1, transmission of the transmission signal TX, reception of the reception signal RX, and derivation of the target information are repeatedly performed in this order.

A delay time τ with respect to the transmission signal TX is generated for the reception signal RX. The delay time τ corresponds to a distance D from the radar device 1 to the target. When there is a velocity difference between the own vehicle velocity and the target velocity, a frequency difference corresponding to Doppler shift is generated in the reception signal RX with respect to the transmission signal TX.

The lower diagram of FIG. 4 illustrates the beat signal BS. The beat signal BS1 is generated by mixing the transmission signal TX1 and the reception signal RX1, and the beat signal BS2 is generated by mixing the transmission signal TX2 and the reception signal RX2. The beat signal BS indicates a difference frequency (that is, a beat frequency) between the transmission frequency of the transmission signal TX and the reception frequency of the reception signal RX. For example, the beat frequency in the UP zones U1, U2, U3, and U4 is BF1, and the beat frequency in the DOWN zones D1, D2, D3, and D4 is BF2. In this way, the beat frequency is derived in each zone.

In the processor 17, fast Fourier transform (FFT) is applied to the beat signal BS input from the ADC 16 to convert the beat signal BS into a frequency spectrum as data of a frequency region, and a frequency spectrum of the beat signal BS is obtained in each of the UP zone and the DOWN zone. Hereinafter, the frequency spectrum of the beat signal BS may also be referred to as "FFT data".

By using the FFT data derived as described above, the longitudinal distance, the relative velocity, and the transverse distance of the target with respect to the radar device 1 are derived. For example, the distance of the target with respect to the radar device 1 is derived through the expression (1), and the relative velocity of the target with respect to the radar device 1 is derived through the expression (2). For example, the angle of the target with respect to the radar device 1 is derived through the expression (3). Based on the distance derived through the expression (1) and the angle derived through the expression (3), the longitudinal distance and the transverse distance of the target with respect to the radar device 1 are derived through an arithmetic operation using a trigonometric function.

$$R = \frac{(f_{up} + f_{dn}) \cdot c}{2 \times (4 \times \Delta F \times f_m)} \quad (1)$$

$$V = \frac{(f_{up} + f_{dn}) \cdot c}{2 \times (4 \times \Delta F \times f_m)} \quad (2)$$

$$\theta_m = \frac{\theta_{up} + \theta_{dn}}{2} \quad (3)$$

Function of Processor

Figure 5:
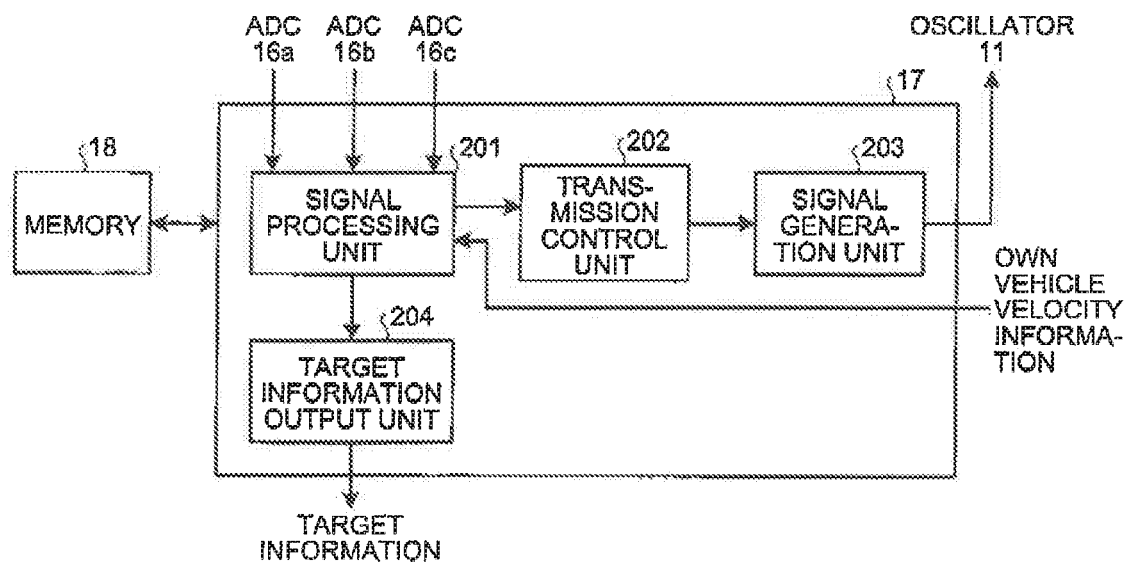
FIG. 5 is a functional block diagram illustrating a function of a processor according to the first embodiment.

FIG. 5 is a functional block diagram illustrating a function of the processor according to the first embodiment. In FIG. 5 the processor 17 includes a signal processing unit 201, a transmission control unit 202, a signal generation unit 203, and a target information output unit 204 as functions of the processor 17.

The signal generation unit 203 generates a modulation signal the voltage of which is changed in a triangular wave form in accordance with control by the transmission control unit 202, and outputs the generated modulation signal to the oscillator 11.

The signal processing unit 201 acquires a peak of the FFT data in each of the UP zone and the DOWN zone, and generates target information based on the UP peak and the DOWN peak. In this case, the signal processing unit 201 extracts a peak at which power of the FFT data in the UP zone exceeds a predetermined threshold from the FFT data to acquire the UP peak, and extracts a peak at which power of the FFT data in the DOWN zone exceeds a predetermined threshold from the FFT data to acquire the DOWN peak. The signal processing unit 201 derives the target information based on a pair of the UP peak and the DOWN peak, and outputs the derived target information to the target information output unit 204. Details about processing performed by the signal processing init 201 will be described later.

The target information output unit 204 selects a predetermined number of pieces of target information having high priority and having reliability equal to or larger than a predetermined threshold from among pieces of target information input from the signal processing unit 201, and outputs the selected pieces of target information to the vehicle control device 2. Details about processing performed by the target information output unit 204 will be described later.

In this case, "reliability" is information related to classification of the target. Specifically, "reliability" is a value used for determining whether the target is a target related to the standing vehicle or a target related to the upper object based on a plurality of parameters of the target. In a plurality of times of scan processing by the radar device, if the reliability is equal to or larger than the threshold, the target is determined to be a target related to the standing vehicle. If the reliability is smaller than the threshold, the target is determined to be a target related to the upper object. Due to such determination, it can be accurately determined whether the object having the target is an object with which the own vehicle collides when the own vehicle travels in a traveling direction.

The memory 18 stores therein the FFT data, the target information, and the like derived by the signal processing unit 201. For example, the memory 18 stores therein the FFT data and the target information derived in each of a previous processing zone (for example, the processor processing zone PA (FIG. 4)) and a current processing zone (for example, the processor processing zone PB (FIG. 4)). That is, the memory 18 stores therein a plurality of pieces of time-series FFT data, and a plurality of pieces of time-series target information.

The transmission control unit 202 outputs an instruction to generate the modulation signal to the signal generation unit 20 based on an instruction from the signal processing unit 201. At the time t0, t5, and t10 illustrated in FIG. 4, for example, the signal processing unit 201 gives, to the transmission control unit 202, an output instruction of the instruction to generate the modulation signal.

Processing of Radar Device

Figure 6:
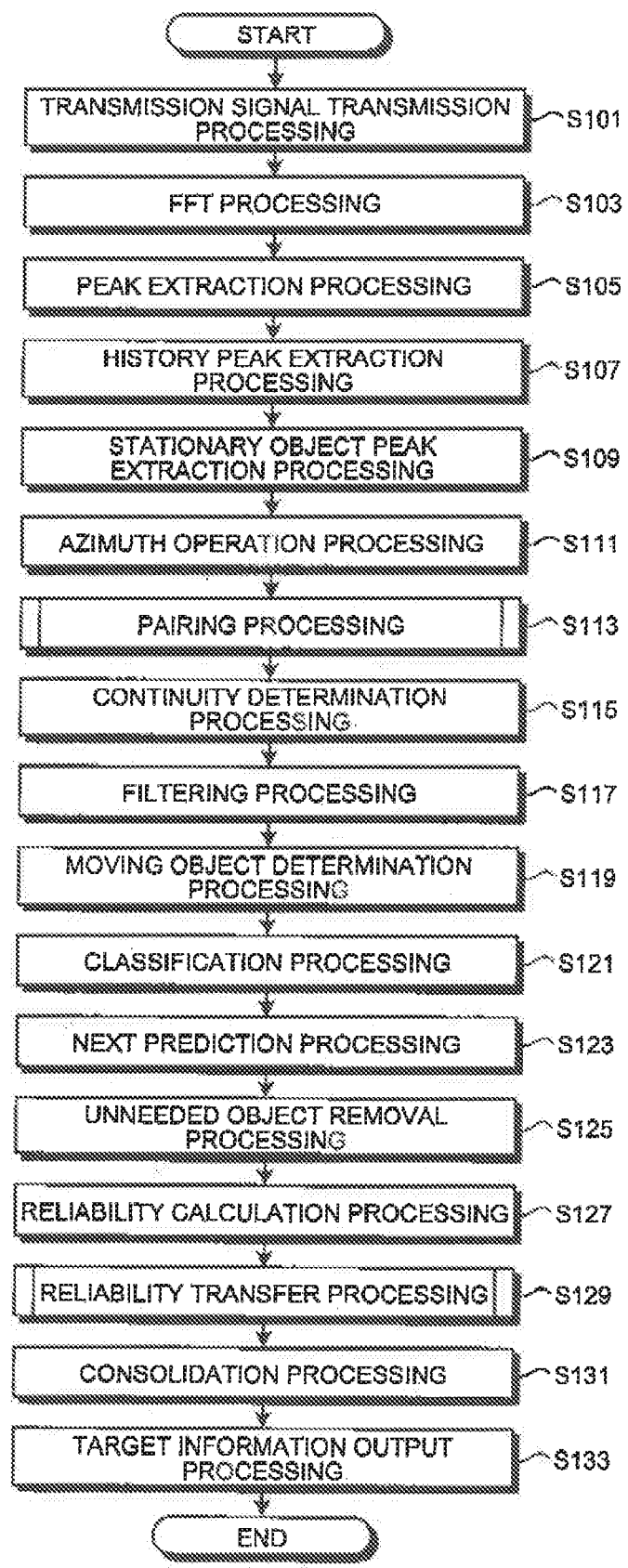
FIG. 6 is a flowchart for explaining an example of processing performed by the radar device according to the first embodiment.

FIG. 6 is a flowchart for explaining an example of processing performed by the radar device according to the first embodiment. In the flowchart in FIG. 6, the processing at Step S101 is performed at the time t0 to t4 and the time t5 to t9 (FIG. 4) and pieces of processing at Steps S103 to S133 are performed in the processor processing zone PA (time t4 to t5) and in the processor processing zone PB (time t9 to t10). Regarding the pieces of processing at Steps S103 to S133 in the flowchart in FIG. 6, if "previous processing" is performed in the processor processing zone PA, "current processing" is performed in the processor processing zone PB.

At Step S101, the transmission signal TX transmitted from the transmission antenna 12 is reflected by the object to arrive at the radar device 1, and received as the reception signal RX by the reception antenna 13. The transmission signal TX and the reception signal RX are mixed by the mixer 14 to generate an analog beat signal BS. The analog beat signal BS is converted into the digital beat signal BS by the ADC 16, and the converted digital beat signal BS is input to the signal processing unit 201.

At Step S103, the signal processing unit 201 applies FFT to the beat signal BS input from the ADC 16 to acquire the FFT data in each of the UP zone and the DOWN zone.

At Step S105, the signal processing unit 201 performs peak extraction processing to acquire the peak of the FFT data in each of the UP zone and the DOWN zone. In the peak extraction processing, the signal processing unit 201 extracts a peak at which power of the FFT data in the UP zone exceeds a predetermined threshold from the FFT data to acquire the UP peak, and extracts a peak at which power of the FFT data in the DOWN zone exceeds a predetermined threshold from the FFT data to acquire the DOWN peak.

At Step S107, the signal processing unit 201 performs "history peak extraction processing" for extracting a peak having temporal continuity with a peak related to a past target (hereinafter, also referred to as a "history peak" in cases) from among peaks extracted in current peak extraction processing (Step S105).

That is, at Step S107, the signal processing unit 201 extracts, as the history peak, a peak in a range of a predetermined frequency based on a frequency of a predicted value (hereinafter, also referred to as a "predicted peak" in some cases) of a peak derived in "next prediction processing (Step S121)" performed in a previous processing zone of the processor 17 for each of the UP zone and the DOWN zone. Hereinafter, a predicted value of the UP peak may be referred to as a "predicted UP peak", and a predicted value of the DOWN peak may be referred to as a "predicted DOWN peak". Hereinafter, a history peak in the UP zone may be referred to as a "history UP peak", and a history peak in the DOWN zone may be referred to as a "history DOWN peak". The following describes the processing at Step S107 in more detail.

Figure 7:
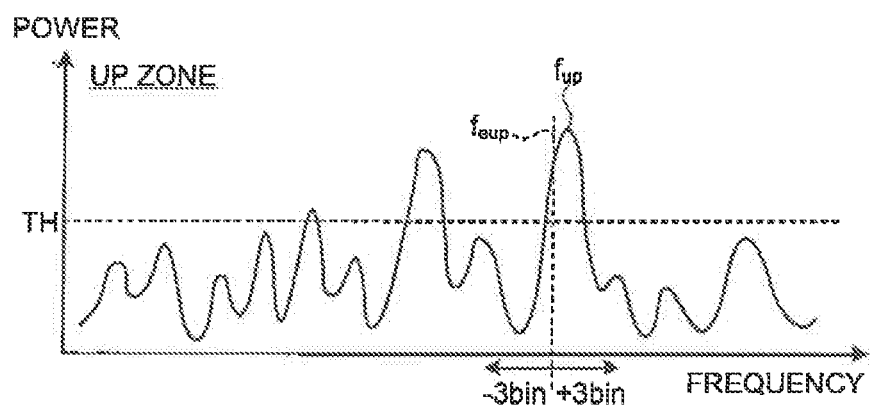
FIGS. 7 and 8 are diagrams for explaining an operation example of a signal processing unit according to the first embodiment.
Figure 8:
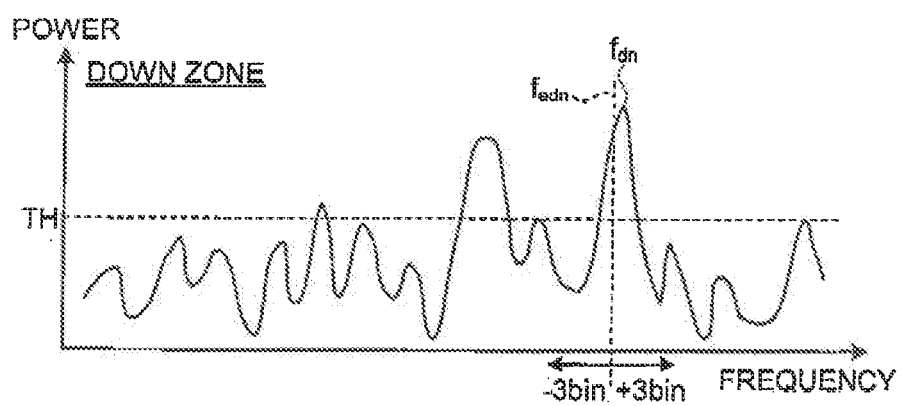

FIGS. 7 and 8 are diagrams for explaining an operation example of the signal processing unit according to the first embodiment. FIG. 7 illustrates the UP peak in the FFT data, and FIG. 8 illustrates the DOWN peak in the FFT data. In FIG. 7, the signal processing unit 201 searches for the history UP peak in a range of ±3 bin centered on a frequency $f_{eup}$ of the predicted UP peak. In the case illustrated in FIG. 7, the UP peak $f_{up}$ having power equal to or larger than a threshold TH is present within a range of ±3 bin of the frequency $f_{eup}$, so that the signal processing unit 201 extracts the UP peak $f_{up}$ as the history UP peak. For example, 1 bin is about 468 Hz.

Similarly, in FIG. 8, the signal processing unit 201 searches for the history DOWN peak in a range of ±3 bin centered on a frequency $f_{edn}$ of the predicted DOWN peak. In the case illustrated in FIG. 8, the DOWN peak $f_{dn}$ having power equal to or larger than the threshold TH is present within a range of ±3 bin of the frequency $f_{edn}$, so that the signal processing unit 201 extracts the DOWN peak $f_{dn}$ as the history DOWN peak.

When a plurality of peaks each having power equal to or larger than the threshold TH are present within a range of ±3 bin of the frequency of the predicted peak, the signal processing unit 201 extracts, as the history peak, a peak present at a frequency position nearest to the frequency of the predicted peak.

At Step S109, the signal processing unit 201 extracts a peak in each zone in which a frequency difference between the UP peak and the DOWN peak corresponds to the own vehicle velocity as a peak corresponding to a stationary object (hereinafter, also referred to as a "stationary object peak" in some cases) based on the own vehicle velocity information input from the vehicle velocity sensor 40. In this case, the stationary object is an object having a relative velocity that is substantially the same as the own vehicle velocity, and the moving object is an object having a relative velocity that is different from the own vehicle velocity.

The history peak extraction processing (Step S107) and the stationary object peak extraction processing (Step S109) are performed as described above to select a peak corresponding to the target that needs to be preferentially given to the vehicle control device 2 by the radar device 1. For example, among targets corresponding to the peaks extracted in the current peak extraction processing (Step S105), the target corresponding to the peak having temporal continuity with a peak of a preceding target exists with higher probability as compared with a target corresponding to a peak newly extracted in the current processing. Thus, priority of the peak having temporal continuity may be higher than that of the newly extracted peak. For example, the moving object may collide with the vehicle CR with higher possibility as compared with the stationary object, so that priority of the peak corresponding to the moving object may be higher than that of the peak corresponding to the stationary object.

At Step S111, the signal processing unit 201 computes an azimuth of the target based on the extracted peak in each of the UP zone and the DOWN zone. For example, the signal processing unit 201 derives the azimuth (angle) of the target using a predetermined azimuth operation algorithm such as estimation of signal parameters via rotational invariance techniques (ESPRIT). When the ESPRIT is used, the signal processing unit 201 computes an eigenvalue of a correlation matrix, an eigenvector, and the like from phase information of the reception signal RX in the reception antenna 13 to derive an angle $\theta_{up}$ corresponding to the UP peak and an angle $\theta_{dn}$ corresponding to the DOWN peak. The signal processing unit 201 then derives an angle of the target from the angle $\theta_{up}$ and the angle $\theta_{dn}$ in accordance with the expression (3). One peak may include information about a plurality of targets. For example, regarding positional information of the target with respect to the radar device 1, information about a plurality of targets having the same distance value and different angle values may be included in the peak at the same frequency. In such a case, phases of a plurality of reception signals RX coming from different angles are different from each other, so that the signal processing unit 201 derives a plurality of angles corresponding to a plurality of targets for one peak based on the phase of each reception signal RX.

At Step S113, the signal processing unit 201 performs "pairing processing" for pairing the UP peak with the DOWN peak. The pairing processing is performed between the history UP peak and the history DOWN peak for history peaks extracted in the history peak extraction processing (Step S107) among all peaks extracted in the peak extraction processing (Step S105). The pairing processing is performed between the stationary object peak in the UP zone (hereinafter, also referred to as a "stationary object UP peak" in some cases) and the stationary object peak in the DOWN zone (hereinafter, also referred to as a "stationary object DOWN peak" in some cases) for stationary object peaks extracted in the stationary object peak extraction processing (Step S109) among all the peaks extracted in the peak extraction processing (Step S105). For remaining peaks (hereinafter, also referred to as a "residual peak" in some cases) excluding the history peak and the stationary object peak from all the peaks extracted in the peak extraction processing (Step S105), the pairing processing is performed between a residual peak in the UP zone (hereinafter, also referred to as a "residual UP peak" in some cases) and a residual peak in the DOWN zone (hereinafter, also referred to as a "residual DOWN peak" in some cases).

The pairing processing between the UP peak and the DOWN peak is performed, for example, through an arithmetic operation using "Mahalanobis distance". For example, the UP peak and the DOWN peak are experimentally paired before the radar device 1 is mounted on the vehicle CR, and a plurality of "normal pairs" and a plurality of "mistaken pairs" are acquired, the normal pair being pair data of pairings of normal combinations among a plurality of pairings, and the mistaken pair being pair data of pairing of mistaken combinations among a plurality of pairings. For each of the normal pairs, three parameter values including a "difference in power of a frequency spectrum", a "difference in an angle", and a "difference in power of an angle spectrum" between the UP peak and the DOWN peak are obtained, and an average value for each of the three parameters is derived among the normal pairs to be stored in the memory 18 in advance.

When the processor 17 derives the target information after the radar device 1 is mounted on the vehicle CR, the signal processing unit 201 derives a Mahalanobis distance $D_M(x)$ through the expression (4) using three parameter values for all combinations of the UP peak and the DOWN peak and the average value for each of the three parameters among the normal pairs. The signal processing unit 201 derives, as the normal pair, a pair in which the Mahalanobis distance $D_M(x)$ becomes the smallest in the current processing. In this case, the Mahalanobis distance $D_M(x)$ corresponds to a group of values represented by a multivariable vector $x=(x1, x2, x3)$ in which an average in $\mu=(\mu 1, \mu 2, \mu 3)^T$ and a covariance matrix is $\Sigma$, and is derived through the expression (4). Elements $\mu 1$, $\mu 2$, and $\mu 3$ indicate three parameter values of the normal pair, and elements x1, x2, and x3 indicate three parameter values of a pair in the current processing.

$$D_M(x) = \sqrt{(x-\mu)^T \Sigma^{-1} (x-\mu)} \qquad (4)$$

The signal processing unit 201 then derives the longitudinal distance, the relative velocity, and the transverse distance of the normal pair using the parameter values of the normal pair and the expressions (1) to (3) in the pairing processing. Pairing processing using the history peak will be described later.

At Step S115, the signal processing unit 201 determines whether there is temporal continuity between the pair data paired in the current pairing processing (Step S113) (hereinafter, also referred to as a "current pair" in some cases) and the pair data paired in the preceding pairing processing (Step S113) (hereinafter, also referred to as a "preceding pair" in some cases). The case in which there is temporal continuity between the current pair the preceding pair means a case it which, for example, a difference in the longitudinal distance, a difference in the transverse distance, and a difference in the relative velocity between the current pair predicted based on the preceding pair (hereinafter, also referred to as a "predicted pair" in some cases) and an actually acquired current pair are all within ranges of predetermined values. In this case, the target detected in the current processing is determined to be the same target as the target detected in the previous processing. If there is a plurality of current pairs within the ranges of the predetermined values, the signal processing unit 201 determines the current pair having a minimum difference from the predicted pair among a plurality of current pairs to be the pair data having temporal continuity with the preceding pair.

On the other hand, if any of the difference in the longitudinal distance, the difference in the transverse distance, and the difference in the relative velocity between the predicted pair and the actually acquired current pair is not within the range of the predetermined value, the signal processing unit 201 determines that there is no temporal continuity between the current pair and the preceding pair. The current pair that is determined to have no temporal continuity with the preceding pair as described above is pair data that is derived for the first time in the current processing (hereinafter, also referred to as a "new pair" in some cases).

At Step S117, when there is temporal continuity between the current pair and the preceding pair, the signal processing unit 201 filters the longitudinal distance, the relative velocity, the transverse distance, and a value of the power between the current pair and the predicted pair to derive the filtered pair data (hereinafter, also referred to as "filtered data" in some cases).

For example, when there is temporal continuity between the current pair and the preceding pair, regarding the transverse distance, the signal processing unit 201 weights the transverse distance of the predicted pair by 0.75, weights the transverse distance of the current pair by 0.25, and derives the sum of the transverse distances that are weighted as a transverse distance of the filtered data in the current processing. The signal processing unit 201 performs filtering also on the longitudinal distance, the relative velocity, and the value of the power similarly to the transverse distance.

At Step S119, the signal processing unit 201 performs "moving object determination processing" for determining whether the target is a target related to the moving object or a target related to the stationary object based on the own vehicle velocity and the relative velocity of the target. In the moving object determination processing, the signal processing unit 201 sets a "moving object flag" of the pair data corresponding to the target related to the moving object to be ON, and sets a "moving object flag" of the pair data corresponding to the target related to the stationary object to be OFF. That is, the "moving object flag" is a flag indicating whether the detected target is the target related to the moving object or the target related to the stationary object. In the target information output unit 204, the pair data the moving object flag of which is set to be ON is recognized as the pair data corresponding to the moving object, and the pair data the moving object flag of which is set to be OFF is recognized as the pair data corresponding to the stationary object.

At Step S121, the signal processing unit 201 classifies the filtered data into filtered data corresponding to the leading vehicle, filtered data corresponding to another vehicle (hereinafter, also referred to as "oncoming vehicle" in some cases) traveling in front of the own vehicle toward an opposite direction of the own vehicle, and filtered data corresponding to the stationary object. For example, the signal processing unit 201 classifies the filtered data having the relative velocity larger than a velocity in the opposite direction of the own vehicle velocity as the filtered data corresponding to the leading vehicle, classifies the filtered data having the relative velocity smaller than the velocity in the opposite direction of the own vehicle velocity as the filtered data corresponding to the oncoming vehicle, and classifies the filtered data having the relative velocity that is substantially the same as the velocity in the opposite direction of the own vehicle velocity as the filtered data corresponding to the stationary object.

At Step S123, the signal processing unit 201 derives a predicted value (a predicted longitudinal distance, a predicted relative velocity, a predicted transverse distance, and the like) to be used for the next history peak extraction processing (Step S107). For example, the signal processing unit 201 specifies a predetermined number of pieces of filtered data having high priority for controlling the vehicle CR, derives the predicted peak of each of the UP peak and the DOWN peak corresponding to the specified pieces of filtered data, and performs the history peak extraction processing (Step S107) in the next processing zone of the processor 17 using the derived predicted peak. Regarding the priority of the filtered data, in the ACC, high priority is given to the filter data having a horizontal position corresponding to a lane (hereinafter, also referred to as "its own lane") on which the vehicle CR is traveling and having a relatively small longitudinal distance with respect to the vehicle CR, and low priority is given to the filtered data having a horizontal position corresponding a lane adjacent to its own lane and having a relatively large longitudinal distance with respect to the vehicle CR.

For example, the signal processing unit 201 performs processing opposite to the processing for pairing the UP peak with the DOWN peak to separate the filtered data into the UP peak and the DOWN peak. The signal processing unit 201 derives the predicted UP peak using frequency information and angle information of the UP peak, and derives the predicted DOWN peak using frequency information angle information of the DOWN peak.

At Step S125, the signal processing unit 201 removes, from the pieces of filtered data derived in the above processing, the filtered data that is not necessarily output to the vehicle control device 2 as the target information. For example, the signal processing unit 201 removes, from the pieces of filtered data derived in the above processing, the filtered data corresponding to the stationary object present at a position higher than the height of the vehicle CR by a predetermined distance (for example, an overhung or overhead road sign and the like arranged above a road). For example, the signal processing unit 201 removes, from the pieces of filtered data derived in the above processing, the filtered data corresponding to the stationary object present at a position lower than the bottom of the vehicle CR (for example, a road rivet and the like placed at a median strip or a curve of a road). For example, the signal processing unit 201 removes, from the pieces filtered data derived in the above processing, the filtered data corresponding to a ghost peak caused by interference (intermodulation) between a peak corresponding to the target actually present at position distant from the radar device 1 by a predetermined distance or more and switching noise in a DC-DC converter of a power supply devise of the radar device 1. Accordingly, the pieces of filtered data corresponding to the stationary object present at a position higher than the height of the vehicle CR by a predetermined distance, the stationary object present at a position lower than the bottom of the vehicle CR, and the ghost peak are not output to the vehicle control device 2 as the target information.

At Step S127, the signal processing unit 201 calculates reliability of the target derived in the current processing, and weights the calculated reliability and the reliability of the target derived in the previous processing to be added to each other. Such addition processing is performed for each target. Hereinafter, the weighted and added reliability for each target may be referred to as an "addition reliability" in some cases. The reliability of the target is an indicator that indicates whether the target information of the target is appropriate as target information to be output to the vehicle control device 2. The target information of the target having higher reliability is more appropriate as the target information to be output to the vehicle control device 2. In other words, the target having relatively high reliability is a target related to an object with which the own vehicle collides when the own vehicle travels in the traveling direction. The target having relatively low reliability is a target related to an object with which the own vehicle does not collide when the own vehicle travels in the traveling direction.

For example, the reliability of the target is calculated based on a reception signal level, and as the reception signal level is higher, a larger value of reliability is calculated. For example, the target information of the target related to the standing vehicle or the leading vehicle is more appropriate as the target information to be output to the vehicle control device 2 as compared with the target information of the target related to the upper object or the lower object. Thus, for the reliability of the target related to the standing vehicle or the leading vehicle, a larger value than that of the reliability of the target related to the upper object or the lower object is calculated. The reliability of the target may be referred to as a "confidence level".

At Step S129, the signal processing unit 201 transfers the reliability between pieces of pair data (that is, between targets). The reliability transfer processing at Step S129 will be described later.

At Step S131, the signal processing unit 201 performs "consolidation processing" for consolidating a plurality of pieces of filtered data corresponding to one object into one piece of data. For example, when the radar device 1 receives a plurality of reception signals reflected at a plurality of reflection points of the same object, the signal processing unit 201 derives a plurality of pieces of filtered data having different pieces of positional information based on the respective reception signals. However, these pieces of filtered data are originally filtered data corresponding to one object. Thus, when the signal processing unit 201 consolidates the pieces of filtered data into one piece of data, the pieces of filtered data corresponding to the same object are treated as one group data. Accordingly, for example, among the pieces of filtered data, when the relative velocity of each piece of filtered data is substantially the same, and the longitudinal distance and the transverse distance of each piece of filtered data are within predetermined ranges, the signal processing unit 201 assumes that the pieces of filtered data are related to the same object, and consolidates the pieces of filtered data into one group data corresponding to one object. The "consolidation processing" may be referred to as "grouping processing" or "grouping".

At step S133, the target information output unit 204 selects a predetermined number of pieces of group data having high priority from among pieces of group data on which the consolidation processing (Step S131) is performed, and outputs the selected pieces of group data to the vehicle control device 2 as the target information. The target information output unit 204 selects the pieces of group data having addition reliability equal to or larger than a threshold from among the pieces of group data on which the consolidation processing (Step S131) is performed, and outputs the selected pieces of group data to the vehicle control device 2 as the target information. That is, the target information output unit 204 outputs only of group data corresponding to the target having addition reliability equal to or larger than the threshold to the outside of the radar device 1 as the target information. The addition reliability after the consolidation processing may be, for example, a maximum value among a plurality of pieces of addition reliability of a plurality of targets corresponding to a plurality of pieces of filtered data as consolidation targets.

Pairing Processing

Figure 9:
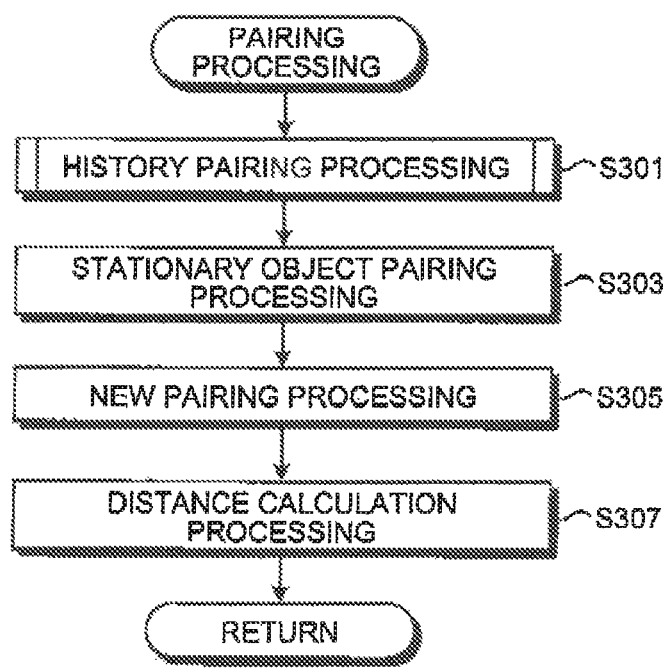
FIG. 9 is a flowchart for explaining an example of pairing processing according to the first embodiment.

FIG. 9 is a flowchart for explaining an example of pairing processing according to the first embodiment. A series of pairing processing illustrated in FIG. 9 corresponds to the processing at Step S113 illustrated in FIG. 6.

In FIG. 9, at Step S301, the signal processing unit 201 firstly derives a "history pair" as pair data obtained by pairing the history UP peak with the history DOWN peak extracted in the history peak extraction processing (Step S107).

Figure 10:
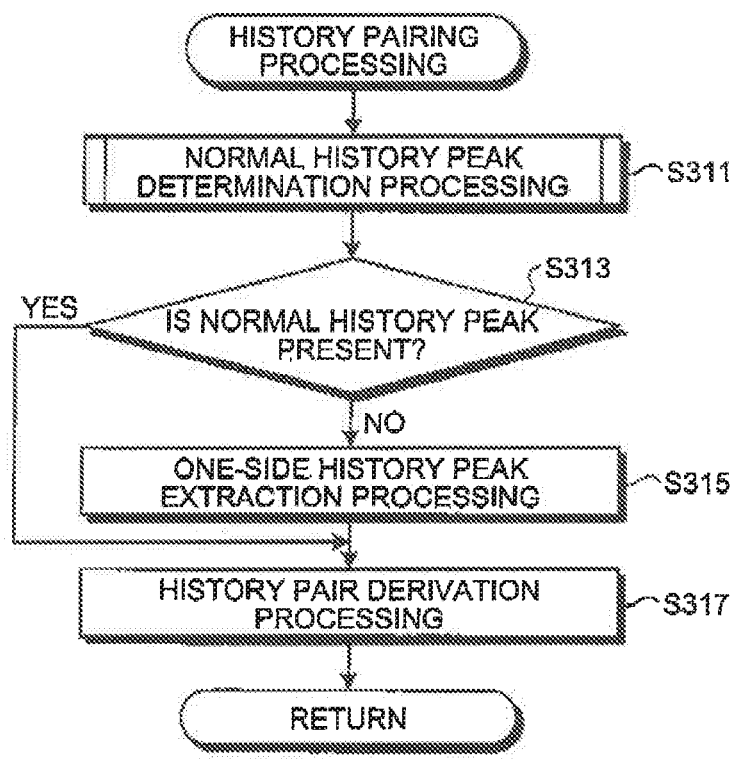
FIG. 10 is a flowchart for explaining an example of history pairing processing according to the first embodiment.

The following describes the history pairing processing at Step S301 in more detail. FIG. 10 is a flowchart for explaining an example of the history pal processing according to the first embodiment.

In FIG. 10, at Step S311, the signal processing unit 201 performs "normal history peak determination processing" for extracting the history UP peak and the history DOWN peak corresponding to the predicted UP peak and the predicted DOWN peak from among history peaks included in a predetermined frequency range.

Figure 11:
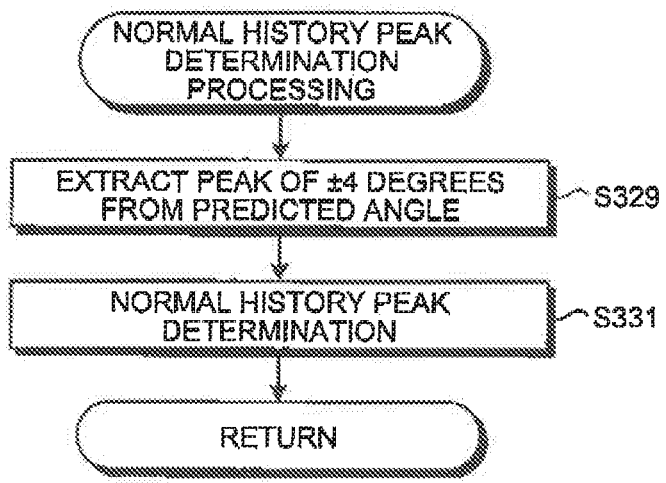
FIG. 11 is a flowchart for explaining an example of normal history peak determination processing according to the first embodiment.

FIG. 11 is a flowchart for explaining an example of the normal history peak de termination processing according to the first embodiment.

In FIG. 11, at Step S329, the signal processing unit 201 extracts a history peak from among the history peaks extracted at Step S107, a difference between an angle derived from the history peak and an angle derived from the predicted peak (hereinafter, also referred to as a "predicted angle" in some cases) being equal to or smaller than 4 degrees. For example, the signal processing unit 201 performs processing similar to the azimuth operation described above using the history UP peak extracted at Step S107 to derive the angle. The signal processing unit 201 compares the derived angle with the predicted angle derived from the predicted UP peak, and extracts the history UP peak having an angle difference therebetween of ±4 degrees (hereinafter, also referred to as a "normal history UP peak" in some cases). Similarly to the history UP peak, also for the history DOWN peak, the signal processing unit 201 compares the angle derived from the history DOWN peak with the predicted angle derived from the predicted DOWN peak, and extracts the history DOWN peak having an angle difference therebetween being equal to or smaller than 4 degrees (hereinafter, also referred to as a "normal history DOWN peak" in some cases). Hereinafter, the "normal history UP peak" and the "normal history DOWN peak" are collectively referred to as a "normal history peak", The following describes the processing at Step S329 in more detail.

Figure 12:
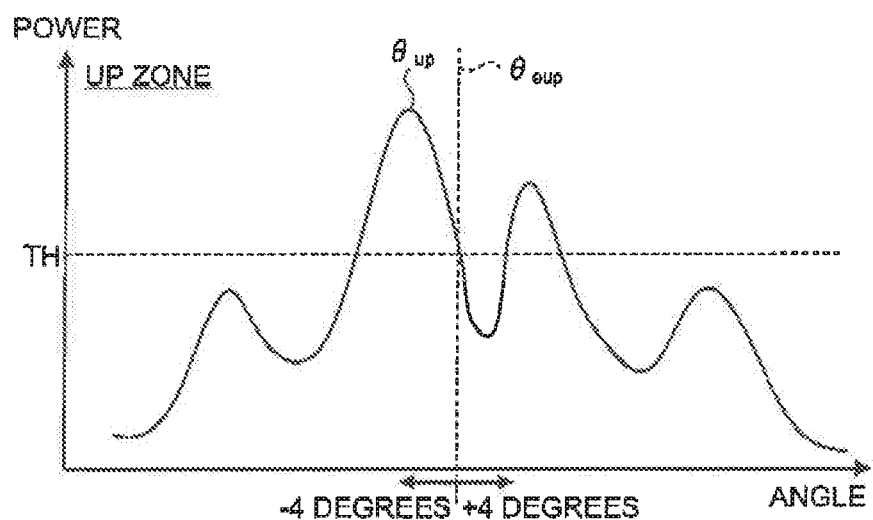
FIGS. 12 and 13 are diagrams for explaining an operation example of the signal processing unit according to the first embodiment.
Figure 13:
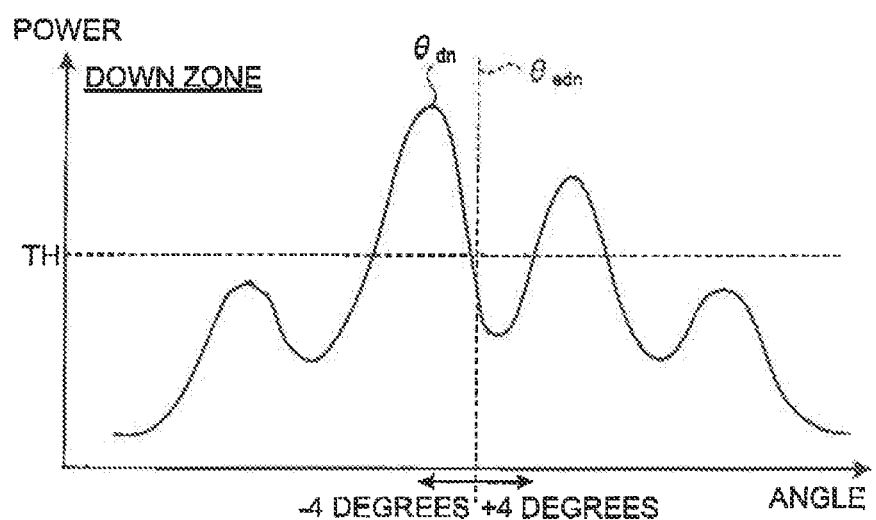

FIGS. 12 and 13 are diagrams for explaining an operation example of the signal processing unit according to the first embodiment. The signal processing unit 201 derives the angle $\theta_{up}$ through the azimuth operation based on the history UP peak $f_{up}$ extracted in the processing at Step S107. FIG. 12 illustrates an angle spectrum derived from the history UP peak $f_{up}$. In FIG. 12, the signal processing unit 201 determines whether the angle $\theta_{up}$ having power equal to or larger than the threshold TH is included within a range of ±4 degrees from the predicted angle $\theta_{eup}$ derived from the predicted UP peak. When the angle $\theta_{up}$ having power equal to or larger than the threshold TH is included within a range of ±4 degrees from the predicted angle $\theta_{eup}$, the signal processing unit 201 determines the history UP peak $f_{up}$ to be the normal history UP peak.

Similarly, the signal processing unit 201 derives the angle $\theta_{dn}$ through the azimuth operation based on the history DOWN peak $f_{dn}$ extracted in the processing at Step S107. FIG. 13 illustrates an angle spectrum derived from the history DOWN peak $f_{dn}$. In FIG. 13, the signal processing unit 201 determines whether the angle $\theta_{dn}$ having power equal to or larger than the threshold TH is included within a range of ±4 degrees from the predicted angle $\theta_{edn}$ derived from the predicted DOWN peak. When the angle $\theta_{dn}$ having power equal to or larger than the threshold TH is included within a range of ±4 degrees from the predicted angle $\theta_{edn}$, the signal processing unit 201 determines the history DOWN peak $f_{dn}$ to be the normal history DOWN peak.

When a plurality of angles $\theta_{up}$ having power equal to or larger than the threshold TH are present within a range of ±4 degrees with respect to the predicted angle $\theta_{eup}$, the signal processing unit 201 determines the history UP peak corresponding to the angle $\theta_{up}$ closest to the predicted angle $\theta_{eup}$ to be the normal history UP peak. Similarly, when a plurality of angles $\theta_{dn}$ having power equal to larger than the threshold TH are present within a range of ±4 degrees with respect to the predicted angle $\theta_{edn}$, the signal processing unit 201 determines the history DOWN peak corresponding to the angle $\theta_{dn}$ closest to the predicted angle $\theta_{edn}$ to be the normal history DOWN peak.

Returning to FIG. 11, at Step S331, the signal processing unit 201 performs "normal history peak determination processing" for determining whether both of the normal history UP peak and the normal history DOWN peak are present. For example, when both of the normal history UP peak and the normal history DOWN peak satisfying the condition of Step S329 are present, the signal processing unit 201 determines that the normal history peak is present. On the other hand, when any one or both of the normal history UP peak and the normal history DOWN peak satisfying the conditions of Step S327 and Step S329 are not present, the signal processing unit 201 determines that the normal history peak is not present.

Returning to FIG. 10, if it is determined that the normal history peak is present at Step S331 (Yes at Step S313), the signal processing unit 201 pairs the normal history UP peak with the normal history DOWN peak to derive the history pair (Step S317).

On the other hand, if it is determined that the normal history peak is not present at Step S331 (No at Step S313), the processing of the signal processing unit 201 proceeds "one-side history peak extraction processing" at Step S315.

In the normal history peak determination processing (Step S311), the signal processing unit 201 determines whether both of the normal history UP peak and the normal history DOWN peak are present. Thus, although the signal processing unit 201 determines that the normal history peak is not present when it is determined that any one of the normal history UP peak and the normal history DOWN peak is not present at Step S331, the signal processing unit 201 holds a determination result that only one of the normal history UP peak and the normal history DOWN peak is present. Thus, in the one-side history peak extraction processing (Step S315), the signal processing unit 201 extracts one of the normal history UP peak and the normal history DOWN peak that is present from a result of the normal history peak determination processing (Step S311). At Step S315, when any one of the normal history UP peak and the normal history DOWN peak is present, the signal processing unit 201 determines that a one-side history peak is present and sets a "one side history pair flag" to be ON, and when both peaks are not present, the signal processing unit 201 determines that the one-side history peak is not present and sets the "one-side history pair flag" to be OFF.

When it is determined that the one-side history peak is present at Step S315, for example the signal processing unit 201 pairs one of the normal history UP peak and the normal history DOWN peak that is present with the other one of the predicted DOWN peak and the predicted UP peak to derive the history pair.

Returning to FIG. 9, after performing the history pairing processing (Step S301), the signal processing unit 201 performs pairing processing on the stationary object peak extracted in the stationary object peak extraction processing (Step S109) at Step S303. At Step S303, the signal processing unit 201 pairs the stationary object UP peak with the stationary object DOWN peak. The signal processing unit 201 pairs the stationary object UP peak with the stationary object DOWN peak similarly to the pairing between the history UP peak and the history DOWN peak.

At Step S305, the signal processing unit 201 pairs the residual UP peak with the residual DOWN peak. The signal processing unit 201 pairs the residual UP peak with the residual DOWN peak similarly to the pairing between the history UP peak and the history DOWN peak. Pair data of the residual UP peak and the residual DOWN peak corresponds to the new pair described above.

At Step S307, the signal processing unit 201 calculates the longitudinal distance, the relative velocity, the angle, the transverse distance, and the like based on the pair data derived in each piece of pairing processing described above. The signal processing unit 201 can calculate the longitudinal distance, the relative velocity, the angle, and the transverse distance based on the pair data derived in stationary object pairing processing (Step S303) and the pair data derived in new pairing processing (Step S305) similarly to the case of using the expressions (1) to (3).

The signal processing unit 201 calculates the longitudinal distance, the relative velocity, the angle, and the transverse distance based on the pair data derived in the history pairing processing (Step S301) as follows.

That is, first, the signal processing unit 201 extracts the history pair in which the one-side history pair flag is set to be ON. One of two peaks included in the history pair in which the one-side history pair flag is set to be CA is normal history UP peak or the normal history DOWN peak, so that the other one thereof is the history DOWN peak or the history UP peak, or the predicted DOWN peak or the predicted UP peak.

Subsequently, the signal processing unit 201 determines whether a prior own-lane leading-vehicle state flag of the extracted history pair is set be ON.

The signal processing unit 201 then determines whether a peak of the FFT data (hereinafter, also referred to as an "FFT peak" in some cases) is present in peaks of the history pair in which the prior own-lane leading-vehicle state flag is set to be ON. If the FFT peak is present, the signal processing unit 201 calculates a distance and the like using the FFT peak. For example, when the history pair is formed with the normal history UP peak and the history DOWN peak, the signal processing unit 201 calculates the distance, the relative velocity, and the like using the FFT peak of the normal history UP peak and the FFT peak of the history DOWN peak. The history DOWN peak does not include angle information, so that the signal processing unit 201 derives an angle of the normal history UP peak as an angle of the history pair. Calculation of the distance and the like using the FFT peak can be performed using the expressions (1) to (3). That is, in the expressions (1) and (2), the signal processing unit 201 uses a frequency of the FFT peak of the normal history UP peak as $f_{up}$, and uses a frequency of the FFT peak of the history DOWN peak as $f_{dn}$. In the expression (3), the signal processing unit 201 uses the angle derived from the normal history UP peak as $\theta_{up}$, and does not use $\theta_{dn}$.

On the other hand, when the FFT peak is not present in the peaks of the history pair in which the pr for own-lane leading-vehicle state flag is set to be ON, one of the two peaks included in the history pair is the predicted peak, so that the signal processing unit 201 calculates the distance and the like using the predicted peak. For example, when the history pair is formed with the normal history UP peak and the predicted DOWN peak, the signal processing unit 201 calculates the distance and the relative velocity using the FFT peak of the normal history UP peak and the predicted peak. The signal processing unit 201 can derive a predicted angle from the predicted DOWN peak. Alternatively, the signal processing unit 201 may derive the angle of the normal history UP peak as the angle of the history pair. Calculation of the distance and the like using the predicted peak can be performed using the expressions (1) to (3). That is, in the expressions (1) and (2), the signal processing unit 201 uses a frequency of the FFT peak of the normal history UP peak as $f_{up}$, and uses a frequency of the FFT peak of the predicted DOWN peak as $f_{dn}$. In the expression (3), the signal processing unit 201 uses the angle derived from the normal history UP peak as $\theta_{up}$, and does not use $\theta_{dn}$.

The case in which the one-side history peak is present has been described above. However, for example, when the normal history peak and the one-side history peak are not present, the distance, the relative velocity, and the angle may be calculated using the predicted peak in both of the UP zone and the DOWN zone.

Reliability Transfer Processing

Figure 14:
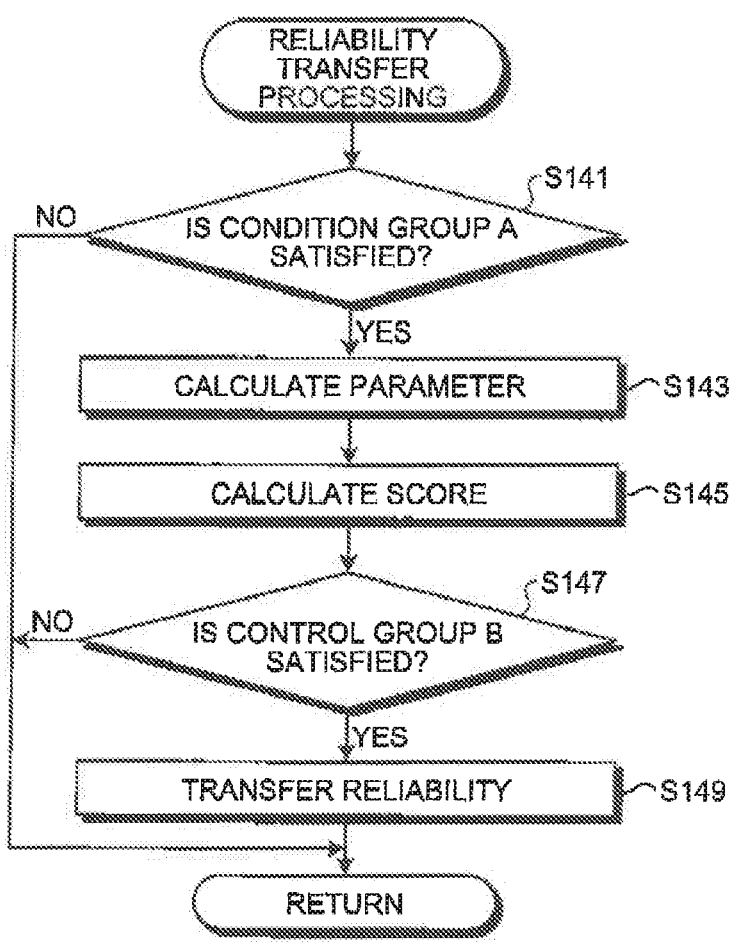
FIG. 14 is a flowchart for explaining an example of reliability transfer processing according to the first embodiment.
Figure 15:
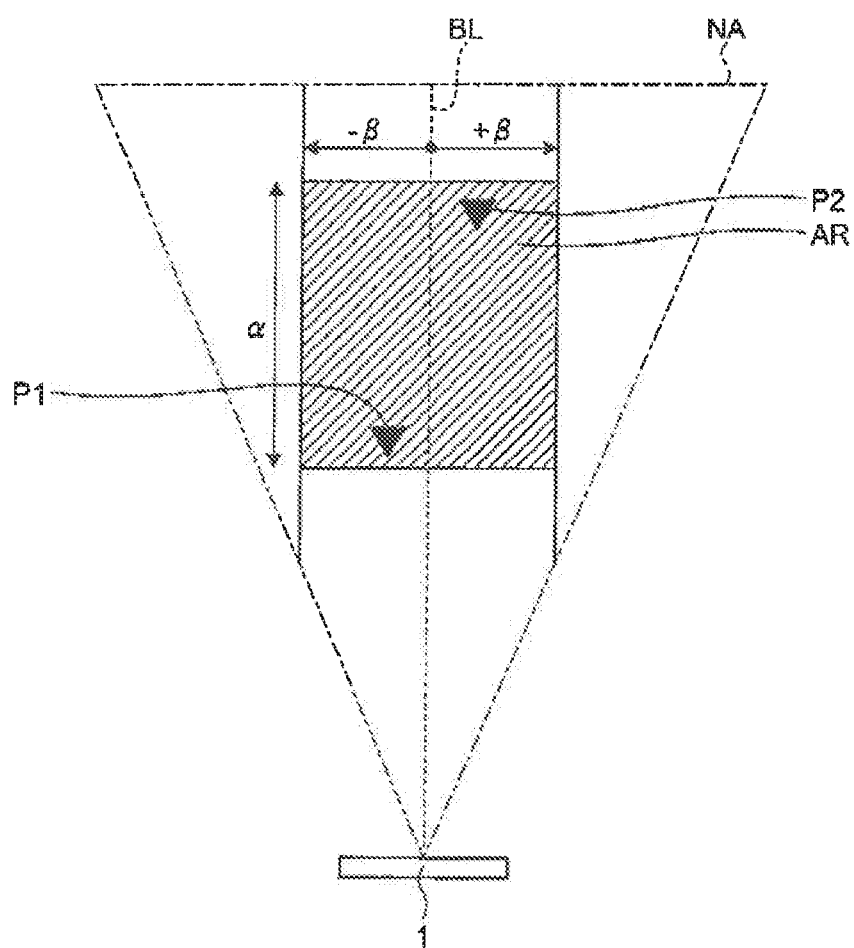
FIGS. 15, 16, and 17 are diagrams for explaining an operation example of the signal processing unit according to the first embodiment.

FIG. 14 is a flowchart for explaining an example of reliability transfer processing according to the first embodiment, and FIG. 15 is a diagram for explaining an operation example of the signal processing unit according to the first embodiment. In FIG. 15, a predetermined region AR is set in a scanning range of the beam pattern NA having the central axis BL. A length in a longitudinal distance direction of the region AR is defined "α", and a length in the transverse distance direction of the region AR is defined as "±β" around the central axis BL. For example, a target P1 and a target P2 are present in the region AR, the target P1 having a reflection point at a rear bumper arranged at the rear end of a truck as the standing vehicle, and tie target P2 having a reflection point at a side mirror arranged in the vicinity of a driver's seat at the front part of the truck as the standing vehicle.

In FIG. 14, at Step S141, the signal processing unit 201 determines whether a "condition group A" is satisfied. The "condition group A" includes the following conditions 1 to 5, and the signal processing unit 201 determines that the condition group A is satisfied when all of the conditions 1 to 5 are satisfied. A case in which both of the condition 3 and the condition 4 are satisfied among the conditions 1 to 5 corresponds to a case in which a plurality of different pieces of pair data belong to the same object, for example, a case in which the target P1 and the target P2 are targets related to the longitudinal multi-identification object. That is, at Step S141, the signal processing unit 201 determines whether a plurality of different targets belong to the same object. In this case, it is assumed that the target P1 is derived later than the target P2 after the target P2 is derived. That is, in the radar device 1, the target P2 is detected earlier than the target P1. When a multipath wave is received from the bottom of the vehicle body of the truck on which a battery and the like are arranged, and the multipath wave interferes with a direct wave from the truck rear end to delay>detection of the target P1 of the rear end, so that a time difference is generated in detection of the target.

The following describes some of conditions for determining whether a plurality of targets (for example, the target P1 and the target P2) are targets belonging to the same object.

Condition 1

The target P1 is a target closet to the radar device 1.

Condition 2

X1<longitudinal distance of target P1<X2

For example, X1=80 m and X2=105 m.

Condition 3

Longitudinal distance of target P1<longitudinal distance of target P2≤longitudinal distance of target P1+α

Condition 4

Absolute value of transverse distance of target P1 and absolute value of transverse distance of target P2<β

Condition 5

The number of targets present in the region AR is equal to or smaller than a threshold. For example, if the threshold is "2", the condition 5 is satisfied when only the target P1 and the target P2 are present in the region R and targets other than the target P1 and the target P2 are not present in the region AR.

At Step S141, if the condition group A is satisfied (Yes at Step S141), the processing proceeds to Step S143. On the other hand, if the condition croup A is not satisfied, that is, if any of the conditions 1 to 5 is not satisfied (No at Step S141), the reliability transfer processing is ended.

At Step S143, the signal processing unit 201 calculates the following four parameters (parameters 1 to 4) for the target P1 having satisfied the condition group A. The following describes another condition for determining whether a plurality of targets (for example, the target P1 and the target P2) are targets belonging to the same object.

Target distance difference w=(longitudinal distance of target P2)−(longitudinal distance of target P1)     Parameter 1

Target angle difference x=(angle of target P2)−(angle of target P1)     Parameter 2

Target relative velocity difference y=(relative velocity of target P2)−(relative velocity of target P1)     Parameter 3

Target angle power difference z=(power of target P2 in angle spectrum)−(power of target P1 in angle spectrum)     Parameter 4

Respective parameters of the targets between which the reliability is transferred are distributed around a specific value while the parameter's are correlated with each other. On the other hand, any value can be taken for the respective parameters of the targets between which the reliability is not transferred, so that distribution thereof does not have a peak.

Figure 16:
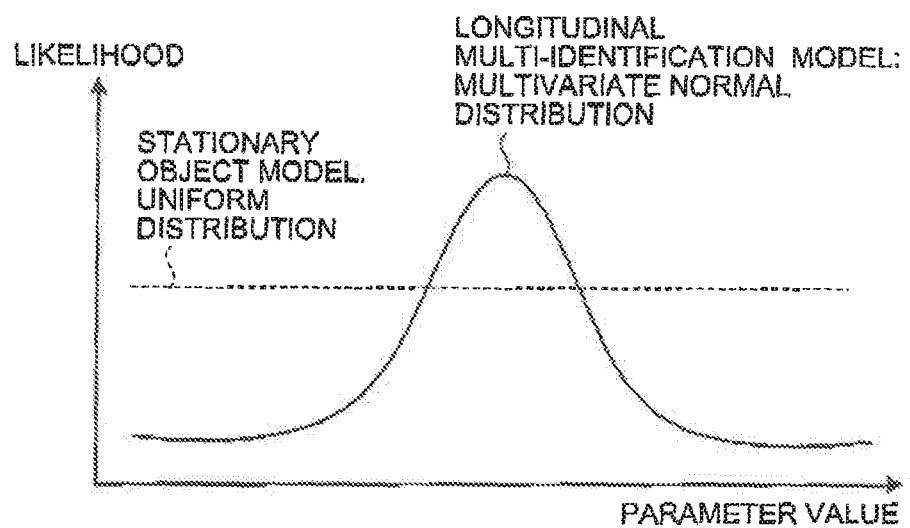

At Step S145, the signal processing unit 201 applies a longitudinal multi-identification model and a stationary object model illustrated in FIG. 16 to the parameters 1 to 4 calculated at Step S143 (the target distance difference w, the target angle difference x, the target relative velocity difference y, and the target angle power difference z) to calculate a score as described below. FIG. 16 is a diagram for explaining an operation example of the signal processing unit according to the first embodiment. In FIG. 16, the longitudinal multi-identification model is defined as multivariate normal distribution, and the stationary object model is defined as uniform distribution. Each of the longitudinal multi-identification model and the stationary object model is an example of a statistical model.

Figure 17:
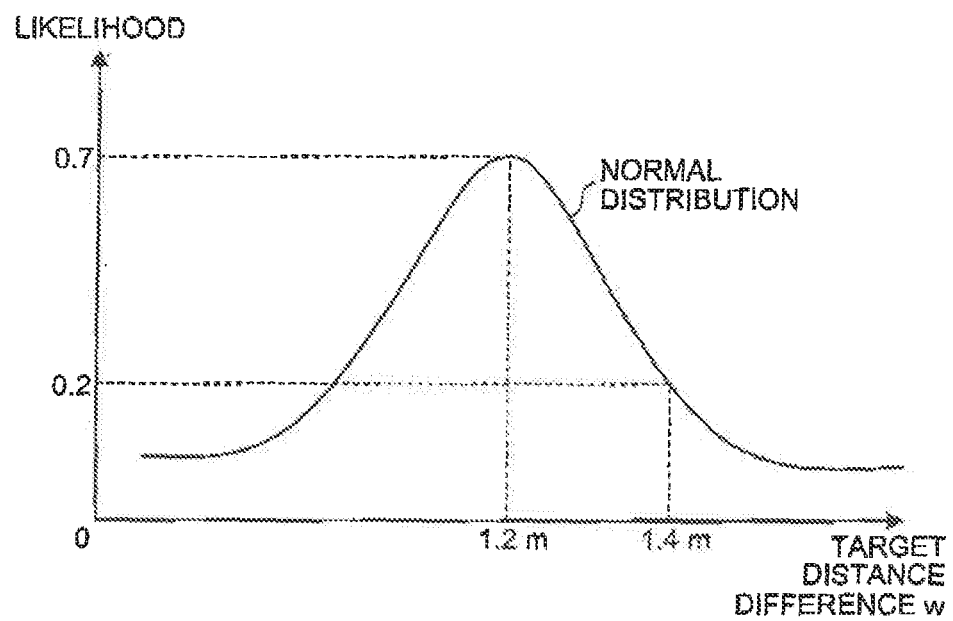

A likelihood in a case in which the target distance difference w is a parameter is calculated as illustrated in FIG. 17. FIG. 17 is a diagram for explaining an operation example of the signal processing unit according to the first embodiment. By using the normal distribution illustrated in FIG. 17, for example, the likelihood is calculated to be 0.7 when the target distance difference w is 1.2 m, and the likelihood is calculated to be 0.2 when the target distance difference w is 1.4 m. Also for the target angle difference x, the target relative velocity difference y, and the target angle power difference z, the likelihood can be calculated by using the normal distribution similarly to the target distance difference w.

First, at Step S145, the signal processing unit 201 calculates a "longitudinal multi-identification likelihood f(x)" in accordance with the expressions (5) to (7). In the expression (5), "m" represents a parameter number. In the expressions (5) and (6), "S" represents a covariance matrix. In the expressions (5) and (7), "$D^2$" represents a Mahalanobis distance. In this case, m=4. In the expressions (6) and (7), parameter values of w, x, y, and z are calculated in the current processing, and an average value, a variance, and a covariance ether than w, x, y, and z are calculated in advance and stored in the memory 18 based on the normal pair ac d before the radar device 1 is mounted on the vehicle CR.

$$f(x) = \frac{1}{\left(\sqrt{2\pi}\right)^m \sqrt{|S|}} \exp\left(-\frac{1}{2}D^2\right) \quad (5)$$

$$S = \begin{pmatrix} s_w^2 & s_{wx} & s_{wy} & s_{wz} \\ s_{wx}^2 & s_x^2 & s_{xy} & s_{xz} \\ s_{wy}^2 & s_{xy} & s_y^2 & s_{yz} \\ s_{wz}^2 & s_{xz} & s_{yz} & s_z^2 \end{pmatrix} \quad (6)$$

-continued $$D^2 = \qquad (7)$$

$$(w-\mu_w \quad x-\mu_x \quad y-\mu_y \quad z-\mu_z) \begin{pmatrix} s_w^2 & s_{wx} & s_{wy} & s_{wz} \\ s_{wx}^2 & s_x^2 & s_{xy} & s_{xz} \\ s_{wy}^2 & s_{xy} & s_y^2 & s_{yz} \\ s_{wz}^2 & s_{xz} & s_{yz} & s_z^2 \end{pmatrix}^{-1} \begin{pmatrix} w-\mu_w \\ x-\mu_x \\ y-\mu_y \\ z-\mu_z \end{pmatrix}$$

| Parameter | Average value | Variance | Covariance |
|---|---|---|---|
| Target distance difference w | $\mu_w$ | $S_w^2$ | $S_{wx}$ |
| Target angle difference x | $\mu_x$ | $S_x^2$ | $S_{xy}$ $S_{wz}$ |
| Target relative velocity difference y | $\mu_y$ | $S_y^2$ | $S_{yz}$ |
| Target angle power difference z | $\mu_z$ | $S_z^2$ | |

The signal processing unit 201 calculates the score in accordance with the expression (8) to be cumulatively added to the score calculated in the previous processing. Hereinafter, the cumulatively added score may be referred to as a "cumulative score" in some cases. The stationary object likelihood in the expression (8) corresponds to the likelihood of the stationary object model illustrated in FIG. 16, and takes a constant value regardless of the parameter value. The cumulative score indicates a probability that both of the target P1 and the target P2 are pair data corresponding to the longitudinal multi-identification object. As the cumulative score is larger, both of the target P1 and the target P2 belong to the longitudinal multi-identification object with higher possibility.

Score=log(longitudinal multi-identification likelihood
 $f(x)$/stationary object likelihood) (8)

At Step S147, the signal processing unit 201 determines whether a "condition group B" satisfied. The "condition group B" includes the following conditions 6 to 10, and the signal processing unit 201 determines that the condition group B is satisfied when all of the conditions 6 to 10 are satisfied. The following describes other conditions for determining whether a plurality of targets (for example, the target P1 and the target P2) are targets belonging to the same object.

Condition 6

The target P1 is consolidated with the target P2 in the preceding consolidation processing (Step S131).

Condition 7

In the preceding consolidation processing (Step S131), the pair data consolidated with the target P1 is only the target P2, and the pair data consolidated with the target P2 is only the target P1.

Condition 8

Cumulative score≥predetermined threshold

Condition 9

Presence time of target P1≤presence time of target P2

Condition 10

Addition reliability of target P1<addition reliability of target P2

At Step S147, if the condition group B is satisfied (Yes at Step S147), the processing proceeds to Step S149. On the other hand, if the condition group B is not satisfied, that is, if any of the conditions 6 to 10 is not satisfied (No at Step S147), the liability transfer processing is ended.

At Step S149, the signal processing unit 201 transfers the addition reliability of the target P2 to the target P1. The target P1 is the pair data that is derived later than the target P2, so that the addition reliability of the target P1 is smaller than the addition reliability of the target P2 before the addition reliability of the target P2 is transferred to the target P1. Thus, the addition reliability of the target P1 is increased by transferring the addition reliability of the target P2 to the target P1, and time until the addition reliability of the target P1 reaches a threshold is shortened.

For example, the addition reliability of the target P1 is "10" and the addition reliability of the target P2 is "82", the addition reliability of the target P1 is changed from "10" to "82" by transferring the addition reliability of the target P2 to the target P1. For example, when the threshold of the addition reliability is "91", the addition reliability "82" of the target P1 after the addition reliability of the target P2 is reflected thereon exceeds the threshold "91" earlier than the addition reliability "10" of the target P1 before the addition reliability of the target P2 is reflected thereon with higher possibility. The reliability of the target P1 related to the rear bumper exceeds the threshold relatively early, so that the radar device 1 can determine classification of the target P1 used as a reference point of the vehicle control device 2 at an early stage.

As described above, in the first embodiment, the radar device 1 includes the signal processing unit 201 and the target information output unit 204. The radar device 1 transmits the transmission signal the transmission frequency of which is changed at predetermined cycles, and receives the reception signal obtained when the transmission signal is reflected by the object. The radar device 1 acquires a peak of the frequency spectrum of the beat signal in the UP zone and the DOWN zone, and derives the target information based on the pair data of the UP peak and the DOWN peak. The target information output unit 204 outputs, to the outside of the radar device 1, only the pair data having addition reliability equal to or larger than the threshold as the target information. The signal processing unit 201 determines whether the target P1 and the target P2 belong to the same object. The target P1 is the pair data derived later than the target P2. If it is determined that the target P1 and the target P2 belong to the same object, the signal processing unit 201 transfers the reliability of the target P2 to the target P1.

That is, the radar device 1 treats information that is acquired as information related to classification the target P2 from the past processing to the current processing as information related to classification of the target P1. The radar device 1 outputs, to the vehicle control device 2, the target information including information related to classification transferred from the target P2 to the target P1. Accordingly, the vehicle control device 2 can appropriately perform brake control and the like for the vehicle based on the target information acquired from the radar device 1.

In this way, by transferring the addition reliability of the target P2 to the target P1, the addition reliability of the target P1 is increased, and the time until the addition reliability of the target P1 reaches the threshold is shortened, so that detection of a desired reference point by the vehicle control device 2 connected to the radar device 1 can be prevented from being delayed.

In the first embodiment, the signal processing unit 201 determines whether to transfer the reliability of the target P2 to the target P1 using the statistical model related to the parameters 1 to 4.

In this way, the reliability can be prevented from being transferred to the pair data that is not appropriate as a destination to which the reliability is transferred.

Second Embodiment

The following describes the radar device 1 according to a second embodiment. The following mainly describes a portion different from the first embodiment, and redundant description will not be repeated.

In the second embodiment, the statistical model used for calculating the score in the reliability transfer processing in the first embodiment described above is changed. Specifically, in the reliability transfer processing in the second embodiment, the signal processing unit 201 calculates or acquires the following four parameters (refer to Step S143 FIG. 14).

Target longitudinal distance difference $w1$=(longitudinal distance of target $P2$)−(longitudinal distance of target $P1$)  Parameter A Target transverse distance difference $w2$=(transverse distance of target $P2$)−(transverse distance of target $P1$)  Parameter B Target angle power difference $z$=(power of target $P2$ in angle spectrum)−(power of target $P1$ in angle spectrum)  Parameter C Factors 1 to 5 of extrapolation processing  Parameter D Subsequently, the signal processing unit 201 applies the statistical model described later to calculate the score based on the parameters A to D (refer to Step S145 in FIG. 14).

First, the following describes the parameters A and B (the target longitudinal distance difference $w1$ and the target transverse distance difference $w2$ (hereinafter, also referred to as "longitudinal/transverse distance differences $w1$ and $w2$" in some cases)). The longitudinal/transverse distance differences $w1$ and $w2$ correlate to each other when the target P1 and the target P2 (refer to FIG. 15) are detected in longitudinal multi-identification of the target to which the reliability is transferred (for example, the standing vehicle).

Thus, in the second embodiment, a two-dimensional normal distribution model (statistical model) including the longitudinal/transverse distance differences $w1$ and $w2$ as parameters is defined in advance, and the signal processing unit 201 calculates the score using the statistical model.

Figure 18A:
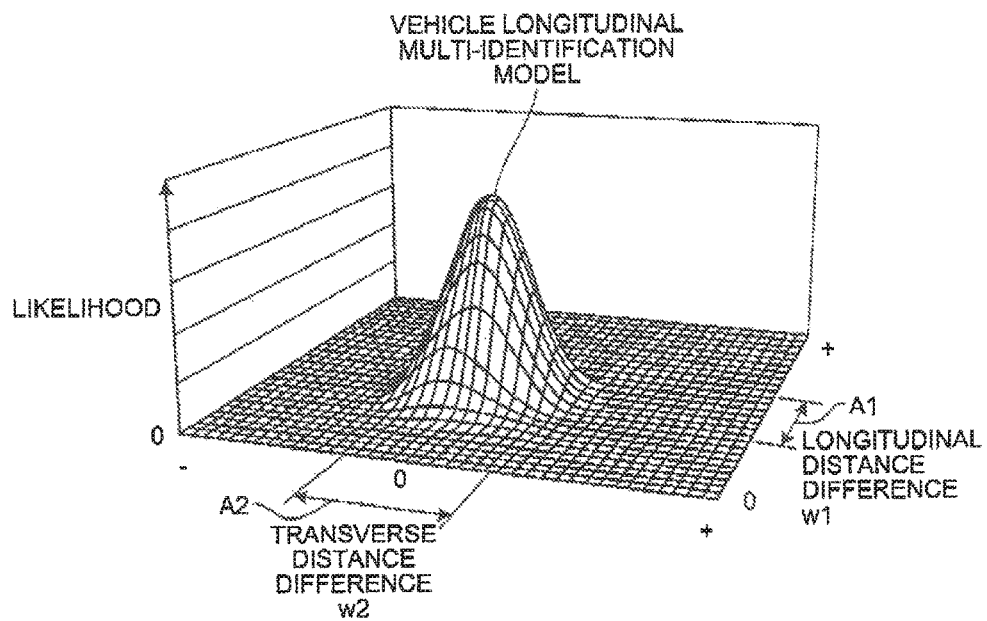
FIGS. 18A and 18B are diagrams for explaining an operation example of a signal processing unit according to a second embodiment.
Figure 18B:
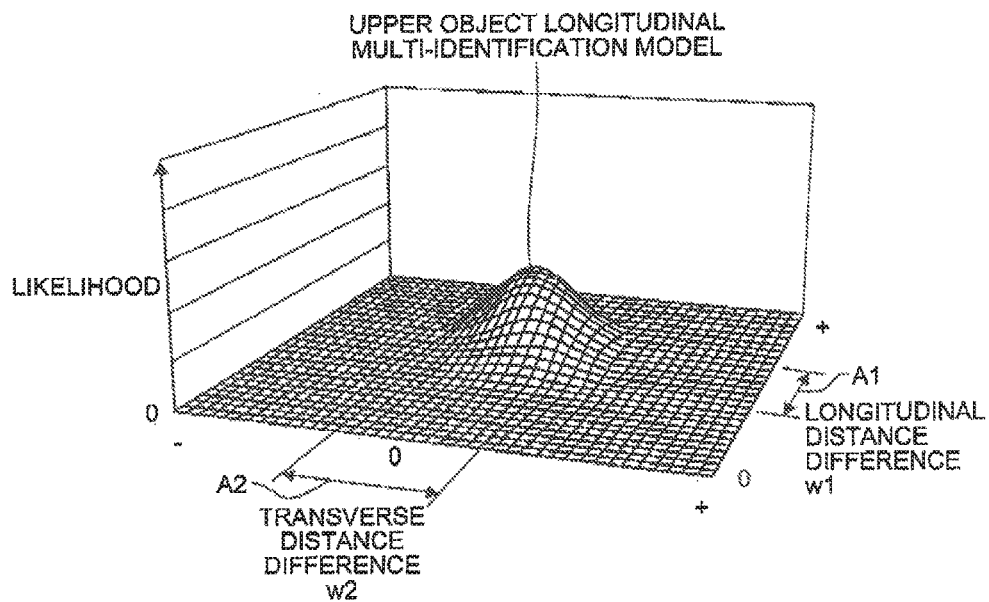

FIGS. 18A and 18B are diagrams for explaining an operation example of the signal processing unit 201 according to the second embodiment. Specifically, FIG. 18A illustrates a statistical model of the likelihood for the longitudinal/transverse distance differences $w1$ and $w2$ in a case in which, for example, the targets P1 and P2 are detected in longitudinal multi-identification of the standing vehicle in its own lane, and FIG. 18B illustrates a statistical model of the likelihood for the longitudinal/transverse distance differences $w1$ and $w2$ in a case in which, for example, the targets P1 and P2 are detected in longitudinal multi-identification of the upper object.

Hereinafter, the statistical model related to longitudinal multi-identification of the standing vehicle in FIG. 18A and the like may be referred to as a "vehicle longitudinal multi-identification model", and the statistical model related to longitudinal multi-identification of the upper object in FIG. 18B and the like may be referred to as an "upper object longitudinal multi-identification model". The likelihood of the vehicle longitudinal multi-identification model may be referred to as a "vehicle longitudinal multi-identification likelihood", and the likelihood of the upper object longitudinal multi-identification model may be referred to as an "upper object longitudinal multi-identification likelihood".

The vehicle longitudinal multi-identification model generally corresponds to the "longitudinal multi-identification model" in the first embodiment, and the upper object longitudinal multi-identification model generally corresponds to the "stationary object model" in the first embodiment. Each of the vehicle longitudinal multi-identification model and the upper object longitudinal multi-identification model in FIGS. 18A and 18B is an example of a first statistical model.

The signal processing unit 201 applies the vehicle longitudinal multi-identification model and the upper object longitudinal multi-identification model to the target longitudinal distance difference $w1$ and the target transverse distance difference $w2$ calculated at Step S143, and calculates the vehicle longitudinal multi-identification likelihood and the upper object longitudinal multi-identification likelihood. The signal processing unit 201 appropriately applies the respective calculated likelihoods to the expression (8) described above to calculate the score. The vehicle longitudinal multi-identification likelihood generally corresponds to the "longitudinal multi-identification likelihood" in the expression (8), and the upper object longitudinal multi-identification likelihood generally corresponds to the "stationery object likelihood" in the expression (8).

The following describes the vehicle longitudinal multi-identification model and the upper object longitudinal multi-identification model illustrated in FIGS. 18A and 18B. The vehicle longitudinal multi-identification likelihood is larger than the upper object longitudinal multi-identification likelihood when the target longitudinal distance difference $w1$ is within a predetermined distance difference range A1 and the target transverse distance difference $w2$ is within a predetermined distance difference range A2.

On the other hand, the vehicle longitudinal multi-identification likelihood is equal to or smaller than the upper object longitudinal multi-identification likelihood when at least one of the target longitudinal distance difference $w1$ and the target transverse distance difference $w2$ is outside a corresponding one of the predetermined distance difference ranges A1 and A2.

Accordingly, as is clear from the expression (8) and the like for calculating the score, the vehicle longitudinal multi-identification model and the upper object longitudinal multi-identification model are set so that the score in a case in which each of the target longitudinal distance difference $w1$ and the target transverse distance difference $w2$ is within the corresponding one of the predetermined distance difference ranges A1 and A2 is higher than the score in a case in which at least one of the target longitudinal distance difference $w1$ and the target transverse distance difference $w2$ is outside the predetermined distance difference ranges A1 and A2. Each of the predetermined distance difference ranges A1 and A2 is a range indicating that the target P1 and the target P2 are highly possibly targets detected in longitudinal multi-identification of the standing vehicle in its own lane.

In this way, in the second embodiment, by using the statistical models (the vehicle longitudinal multi-identification model and the upper object longitudinal multi-identification model) including both of the target longitudinal distance difference $w1$ and the target transverse distance difference $w2$ correlating to each other as parameters, the score can be accurately calculated.

The following describes the parameter C (the target angle power difference $z$). FIG. 19 is a diagram for explaining an operation example of the signal processing unit 201 according to the second embodiment. Specifically, FIG. 19 illustrates the vehicle longitudinal multi-identification model and the upper object longitudinal multi-identification model using the target angle power difference z as the parameter.

The target angle power difference z is an example of reception power difference of the reflected wave between the target P1 the target P2. Each of the vehicle longitudinal multi-identification model and the upper object longitudinal multi-identification model in FIG. 19 is an example of a second statistical model.

As illustrated in FIG. 19, the vehicle longitudinal multi-identification model and the upper object longitudinal multi-identification model for the target angle power difference z are both defined as a normal distribution model in advance. The signal processing unit 201 applies the vehicle longitudinal multi-identification model and the upper object longitudinal multi-identification model illustrated in FIG. 19 to the target angle power difference z calculated at Step S143, and calculates the vehicle longitudinal multi-identification likelihood and the upper object longitudinal multi-identification likelihood. The signal processing unit 201 then calculates the score based on the respective calculated likelihoods.

In this way, in the second embodiment, the upper object longitudinal multi-identification model (stationary object model) that has been defined as the uniform distribution in the first embodiment is defined as the normal distribution, so that the score can be calculated with higher accuracy.

The following describes the parameter D (factors 1 to 5 of the extrapolation processing). The following describes the extrapolation processing before explaining the parameter D.

As described above, in the continuity determination processing (refer to Step S115 in FIG. 6), the signal processing unit 201 predicts a position of target data in the current processing as a predicted pair based on target data (preceding pair) derived in the previous processing. If the longitudinal distance difference, the transverse distance difference, and the like between the predicted pair and the target data derived in the current processing (current pair) are within ranges of predetermined values, the signal processing unit 201 determines that there is temporal continuity between the current pair and the preceding pair.

However, in the current processing of the signal processing unit 201, for example, there is a case in which a peak of the power of the FFT data is not extracted in the peak extraction processing (refer to Step S105 in FIG. 6), and the target data having continuity with the target data derived in the previous processing is not derived.

In such a case, the signal processing unit 201 performs "extrapolation processing" for virtually deriving the target data that is not derived in the current processing based on the parameter (the longitudinal distance, the transverse distance, and the like) of the target data derived in the previous processing. Extrapolation data derived in the extrapolation processing may be treated as the target data derived in the current processing.

As described above, the extrapolation processing is processing for predicting, based on a past position of the target, a virtual position of the target that is not detected in current detection processing when the detection processing for detecting the target is repeatedly performed.

For example, the targets P1 and P2 (refer to FIG. 15) are detected for one object (for example, the standing vehicle or the upper object) and longitudinal multi-identification is caused, for the target P2 on the far side of the radar device 1 of the own vehicle, a peak of the power of the corresponding FFT data is not extracted due to influence of a multipath and the like while detection processing is repeatedly performed, and extrapolation processing is easily caused.

Conventionally, when there is the target (in this case, the target P2) on which the extrapolation processing is performed, the score is not updated and a value of the previous processing is held. In contrast, in the second embodiment, the score is calculated corresponding to a factor by which the extrapolation processing is performed. Accordingly, in the second embodiment, for example, even when the extrapolation processing is performed on the target P2, the score can be updated to an appropriate value.

FIG. 20 is a diagram for explaining an operation example of the signal processing unit 201 according to the second embodiment. Specifically, FIG. 20 illustrates a statistical model (table) using the factors 1 to 5 of the extrapolation processing as the parameters.

The statistical model in FIG. 20 is a statistical model in which, for example, the target data obtained when the extrapolation processing is performed on the target P2 is totalized, the vehicle longitudinal multi-identification likelihood and the upper object longitudinal multi-identification likelihood are calculated in accordance with the factors 1 to 5 of the extrapolation processing, and the score is calculated based on the respective likelihoods. The statistical model in FIG. 20 is an example of a third statistical model.

In the statistical model in FIG. 20, a specific numerical value is set to each likelihood and each score. In this case, a relatively high likelihood equal to or larger than 0.24 is classified as "high", a likelihood equal to or larger than 0.1 and smaller than 0.24 is classified as "middle", a likelihood equal to or larger than 0.01 and smaller than 0.1 is classified as "low", and a very low likelihood smaller than 0.001 is classified as "very low" to be relatively represented. A score to be added to the cumulative score is represented as a "positive value", a score to be subtracted from the cumulative score is represented as a "negative value", and a score that is not added or subtracted is represented as "0".

FIGS. 21A to 21D are schematic diagrams for explaining the factors 1 to 4 of the extrapolation processing. FIGS. 21A to 21D illustrate the FFT data in the UP zone and the DOWN zone, and each graph corresponds to the graph in FIG. 7 or FIG. 8, for example. In FIGS. 21A to 21D, two diagrams on the left side represent the FFT data in the previous processing, and two diagrams on the right side represent the FFT data obtained when the extrapolation processing is performed on the target P2 in the current processing.

Factor 1

Figure 21A:
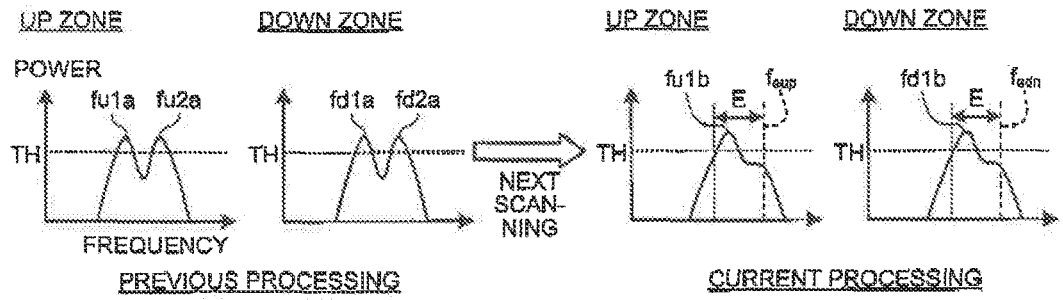
FIG. 21A is a schematic diagram for explaining a factor 1 of extrapolation processing.

First, the following describes the factor 1 of the extrapolation processing with reference to FIG. 21A. In FIG. 21A and the like, the history UP peak of the target P1 in the previous processing is assumed to be "fu1$a$", the history DOWN peak thereof is assumed to be "fd1$a$", the history UP peak of the target P2 is assumed to be "fu2$a$", and the history DOWN peak thereof is assumed to be "fd2$a$", The history UP peak of the target P1 in the current processing is assumed to be "fu1$b$", and the history DOWN peak thereof assumed to be "fd1$b$".

As illustrated in FIG. 21A, the history UP peak and the history DOWN peak are present for the targets P1 and P2 in the previous processing in both of the UP zone and the DOWN zone, so that, for example, pairing and the like through the pairing processing (refer to Step S113 in FIG. 6) are normally performed, and the targets P1 and P2 are both normally detected.

In the current processing, the history UP peak fu1$b$ and the history DOWN peak fd1$b$ for the target P1 are present. On the other hand, for the target P2, power of the reception signal is lowered due to influence of a multipath and the like, and the history UP peak and the history DOWN peak are not present both in the UP zone and the DOWN zone. Accordingly, the extrapolation processing is performed on the target P2.

In the factor 1, the history UP peak fu1b and the history DOWN peak fd1b of the target P1 are within a predicted range E including the frequency $f_{eup}$ of the predicted UP peak of the target P2 and the frequency $f_{edn}$ of the predicted DOWN peak thereof in both of the UP zone and the DOWN zone.

Each of the frequency $f_{eup}$ of the predicted UP peak and the frequency $f_{edn}$ of the predicted DOWN peak is a predicted value of the peak derived based on the previous processing as described above, and is a frequency corresponding to the virtual position of the target P2 predicted in the extrapolation processing, for example. The predicted range E is, for example, set to be in a range from the frequency $f_{eup}$ of the predicted UP peak (or the frequency $f_{edn}$ of the predicted DOWN peak) to −3bin, but the embodiment is not limited thereto.

The peaks in the UP zone and the DOWN zone in the current processing are caused to be in a state of the right figure in FIG. 21A, for example, when one peak is regarded as the history peak of the target P1 because processing related to the target P1 on the near side takes precedence when the one peak becomes a candidate for the history peak for both of the targets P1 and P2. However, the embodiment is not limited thereto.

The factor 1 is a case in which the peaks in the UP zone and the DOWN zone in the current processing is in the state described above and the extrapolation processing is caused. In such a case, as represented by the statistical model of FIG. 20, the vehicle longitudinal multi-identification likelihood is "high", the upper object longitudinal multi-identification likelihood is "low", and the score is "positive value".

Accordingly, when the extrapolation processing is performed on the target P2 in accordance with the factor 1, the signal processing unit 201 applies the statistical model in FIG. 20 to calculate the (positive value). In other words, the signal processing unit 201 calculates the score (positive value) indicating that the targets P1 and P2 are detected in longitudinal multi-identification of the standing vehicle with higher possibility. Conversely, the signal processing unit 201 calculates the score indicating that the targets P1 and P2 detected in longitudinal multi-identification of the upper object with low possibility.

Factor 2

Figure 21B:
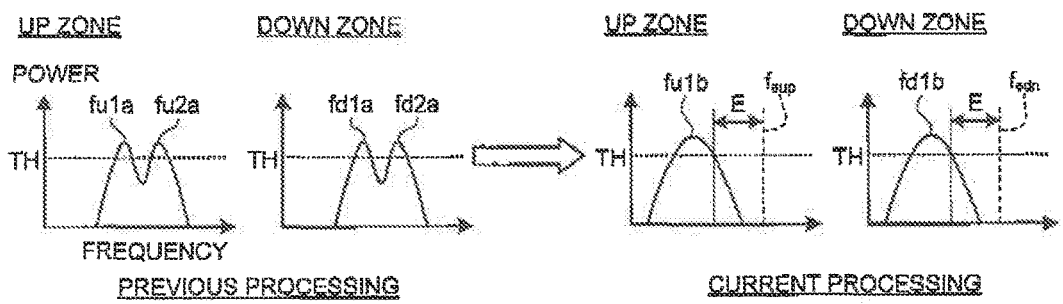
FIG. 21B is a schematic diagram for explaining a factor 2 of the extrapolation processing.

Next, the following describes the factor 2 of the extrapolation processing with reference to FIG. 21B. As illustrated in FIG. 21B, in the previous processing, the targets P1 and P2 are both normally detected. In the current processing, while the history UP peak fu1b and the history DOWN peak fd1b are present, there is no peak for the target P2, and the history UP peak and the history DOWN peak of the target P2 are not present.

In the factor 2, the history UP peak fu1b and the history DOWN peak fd1b of the target P1 are outside the predicted range E of the target P2 in both of the UP zone and the DOWN zone.

The peaks in the UP zone and the DOWN zone in the current processing are caused to be in a state of the right figure in FIG. 21B due to influence of a multipath and the like, and such a state is easily caused when the longitudinal multi-identification object is the upper object rather than the standing vehicle. Thus, as illustrated in FIG. 20, in the statistical model of the factor 2, the vehicle longitudinal multi-identification likelihood is "middle", the upper object longitudinal multi-identification likelihood is "high", and the score is "negative value".

Accordingly, when the extrapolation processing is performed on the target P2 in accordance with the factor 2, the signal processing unit 201 applies the statistical model in FIG. 20 to calculate the score (negative value). That is, the signal processing unit 201 calculates the score (negative value) indicating that the targets P1 and P2 are detected in longitudinal multi-identification of the standing vehicle with low possibility, conversely, indicating that the targets P1 and P2 are detected in longitudinal multi-identification of the upper object with high possibility.

Factor 3

Figure 21C:
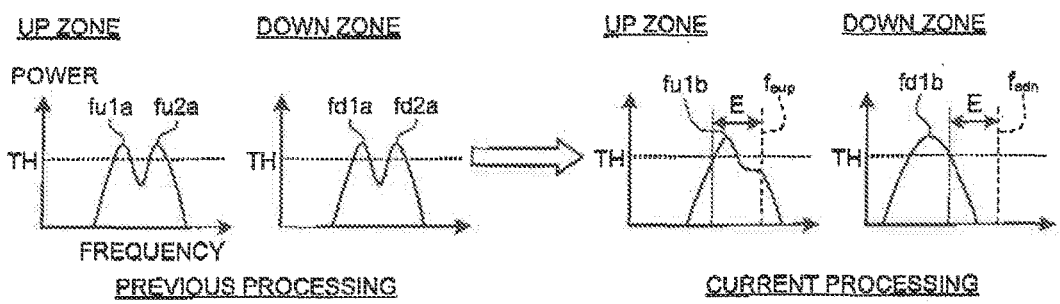
FIG. 21C is a schematic diagram for explaining a factor 3 of the extrapolation processing.

Next, the following describes the factor 3 of the extrapolation processing with reference to FIG. 21C. As illustrated in FIG. 21C, in the previous processing, the targets P1 and P2 are both normally detected. In the current processing, while the history UP peak fu1b and the history DOWN peak fd1b are present, the history UP peak and the history DOWN peak of the target P2 are not present.

In the factor 3, the history UP peak fu1b and the history DOWN peak fd1b of the target P1 are within the predicted range E of the target P2 in one of the UP zone and the DOWN zone (in the example of FIG. 21C, the UP zone), and are outside the predicted range E in the other one thereof (in the example of FIG. 21C, the DOWN zone). In the factor 3, the history UP peak fu1b may be outside the predicted range E, and the history DOWN peak fd1b may be within the predicted range E.

The peaks in the UP zone and the DOWN zone in the current processing are caused to be in a state of the right figure in FIG. 21C due to influence of a multipath and the like, but such a state is hardly caused when the longitudinal multi-identification object is the upper object. Thus, as illustrated in FIG. 20, in the statistical model of the factor 3, the vehicle longitudinal multi-identification likelihood is "middle", the upper object longitudinal multi-identification likelihood is "very low'", and the score is "positive value".

Figure 22:
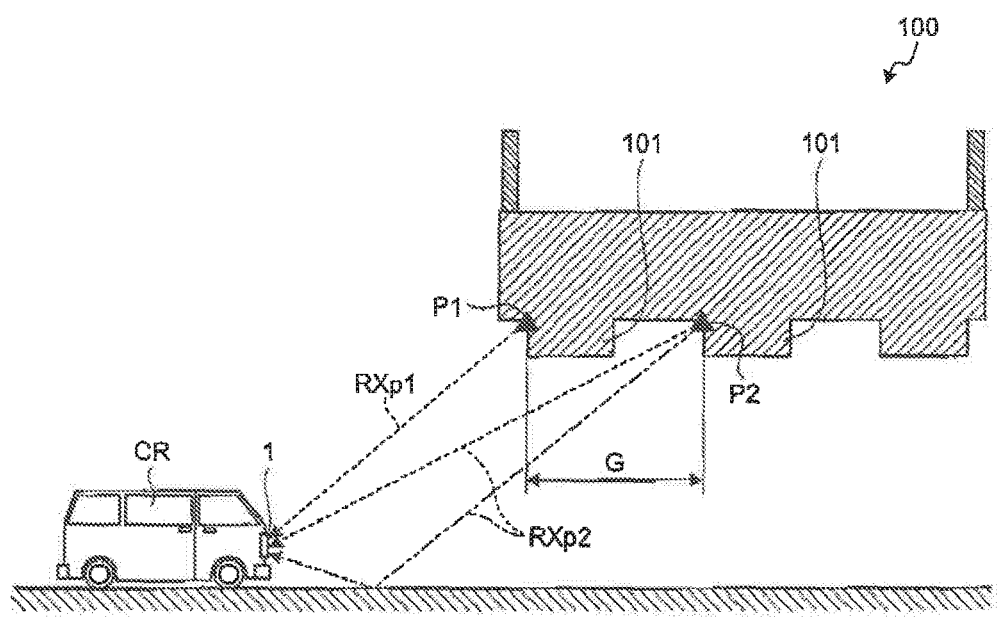
FIG. 22 is a diagram schematically illustrating a state of a reflected wave in a case in which a longitudinal multi-identification object an upper object.

The following describes a reason why the extrapolation processing of the factor 3 is hardly caused when the longitudinal multi-identification object is the upper object, and the upper object longitudinal multi-identification likelihood becomes very low, that is, a very low value. FIG. 22 is a diagram schematically illustrating a state of the reflected wave in a case in which the longitudinal multi-identification object is the upper object.

As illustrated in FIG. 22, exemplified herein is a case in which the upper object is an overhead bridge 100. A lower surface of the overhead bridge 100 has, for example, an uneven shape such that a plurality of projecting portions 101 are continuously formed along the traveling direction of the vehicle CR.

When the transmission wave is transmitted from the radar device 1 to the overhead bridge 100 having such a shape, the transmission wave tends to be reflected near a corner part (a groove portion) on a base end side of the projecting portions 101, for example. Thus, the radar device 1 may receive, for example, two reflected waves RXp1 and RXp2 from the overhead bridge 100 as one object. In such a case, the two targets P1 and P2 are detected, and longitudinal multi-identification is caused.

In this case, while the target P1 is stably and continuously detected, for example, the extrapolation processing may be performed on the target P2 can the far side as represented by a two-dot chain line because the reflected wave RXp2 is influenced by a multipath reflected by the ground and the peak is not extracted.

When the extrapolation processing is performed on the target P2, it tends to be determined in accordance with a structure of the overhead bridge 100 whether the history UP peak fu1b and the history DOWN peak fd1b (refer to the right figures in FIGS. 21A to 21C) of the detected target P1 are present within the predicted range E of the target P2.

Specifically, if a separation distance G between the projecting portions 101 of the overhead bridge 100 is equal to or smaller than a distance corresponding to 3 bin as the predicted range E, as illustrated in the right figure in FIG. 21A, both of the history UP peak fu1b and the history DOWN peak fd1b are present within the predicted range E.

On the other hand, if the separation distance G between the projecting portions 101 is longer than the distance corresponding to 3 bin, as illustrated in the right figure in FIG. 21B, both of the history UP peak fu1b and the history DOWN peak fd1b are present outside the predicted range E. The overhead bridge 100 is a relatively large structure, so that the overhead bridge 100 is often in a state such as the right figure in FIG. 21B.

That is, when the upper object is the overhead bridge 100 having unevenness on the lower surface side, a state in which one of the history UP peak fu1b and the history DOWN peak fd1b is within the predicted range E and the other one thereof is outside the predicted range E as illustrated in the right figure in FIG. 21C is hardly caused.

Thus, when the longitudinal multi-identification object is the upper object (in this case, the overhead bridge 100), the uneven shape is continuously formed, so that the history UP peak fu1b and the history DOWN peak fd1b are caused to be in substantially the same state even if timing of receiving the reflected wave is different between the UP zone and the DOWN zone, and the extrapolation processing related to the state described in the factor 3 is hardly caused. Accordingly, the upper object longitudinal multi-identification likelihood of the factor 3 becomes a very low value.

On the other hand, when the longitudinal multi-identification object is the standing vehicle, the shape of the vehicle includes a plane part and a curved part, so that a state in which one of the history UP peak fu1b and the history DOWN peak fd1b is within the predicted range E and the other one thereof is outside the predicted range E as illustrated in the right figure in FIG. 21C may be caused when the timing of receiving the reflected wave is different between the UP zone and the DOWN zone. That is, the history UP peak fu1b and the history DOWN peak fd1b may be caused to be in different state. Thus, the vehicle longitudinal multi-identification likelihood of the factor 3 is "middle" (refer to FIG. 20).

The score is a ratio between the vehicle longitudinal multi-identification likelihood and the upper object longitudinal multi-identification likelihood, so that the score of the factor 3 becomes a relatively large value. Specifically, the score of the factor 3 is set to be a value larger than the score of the factor 1. The score of the factor 3 is not limited thereto, and may be a value equal to or smaller than the score of the factor 1, for example.

Thus, when the extrapolation processing is performed on the target P2 in accordance with the factor 3, the signal processing unit 201 according to the second embodiment calculates the score (positive value) indicating that the targets P1 and P2 are detected in longitudinal multi-identification of the standing vehicle with high possibility. Conversely, the signal processing unit 201 calculates the score (positive value) indicating that the targets P1 and P2 are detected in longitudinal multi-identification of the upper object with low possibility.

Factor 4

Figure 21D:
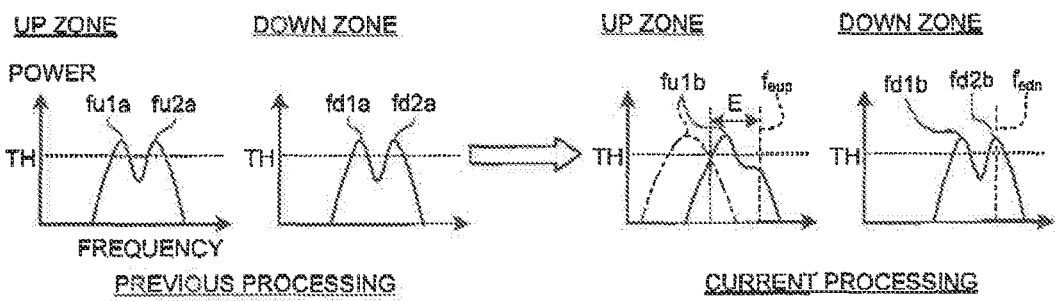
FIG. 21D is a schematic diagram for explaining a factor 4 of the extrapolation processing.

Next, the following describes the factor 4 of the extrapolation processing with reference to FIG. 21D. As illustrated in FIG. 21D, in the previous processing, the targets P1 and P2 are both normally detected. In the current processing, while the history UP peak fu1b and the history DOWN peak fd1b of the target P1 and a history DOWN peak fd2b of the target P2 are present, the history UP peak of the target P2 is not present.

FIG. 21D illustrates a case in which the history UP peak fu1b of the target P1 is within the predicted range E of the target P2, but the embodiment is not limited thereto. For example, as represented by the two-dot chain line, the history UP peak fu1b of the target P1 may be outside the predicted range E.

When the current processing is in the state illustrated in the right figure in FIG. 21D, the history UP peak of the target P2 is not present in the UP zone, so that the extrapolation processing is performed thereon in the UP zone. In the example illustrated in FIG. 21D, the history DOWN peak fd2b of the target P2 is present, but the embodiment is not limited thereto. For example, the history DOWN peak fd2b is not present and the history UP peak of the target P2 may be present in some cases.

That is, in the factor 4, the peaks of the targets P1 and P2 are detected in one of the UP zone and the DOWN zone (in the example of FIG. 21D, the DOWN zone), the peak of the target P1 is detected and the peak of the target P2 is not detected in the other one thereof (in the example of FIG. 21D, the UP zone), and the extrapolation processing is performed. Hereinafter, processing in which the extrapolation processing is performed on the target P2 in the current processing in one of the UP zone and the DOWN zone may be referred to as "one-side extrapolation processing".

In the statistical model in a case of the one-side extrapolation processing of the factor 4, as illustrated in FIG. 20, the vehicle longitudinal multi-identification likelihood is "high", the upper object longitudinal multi-identification likelihood is "high", and the score is "zero". That is, the one-side extrapolation processing may be caused in the same degree when the longitudinal multi-identification object is the upper object or when the longitudinal multi-identification object is the standing vehicle, so that the score is assumed to be zero.

Thus, the signal processing unit 201 calculates the score (zero) indicating not to determine whether the targets P1 and P2 are detected in longitudinal multi-identification of the upper object or in longitudinal multi-identification of the standing vehicle when one-side extrapolation of the factor 4 is performed on the target P2.

Factor 5

Next, the following describes the factor 5 of the extrapolation processing. In the factor 5, the extrapolation processing is performed for reasons other than the factors 1 to 4 described above. Examples of the factor 5 include the fact that an azimuth of the target is not derived in the azimuth operation processing (refer to Step S111 in FIG. 6), the fact that pairing is not performed because the Mahalanobis distance $D_m$ (x) operated in the pairing processing (refer to Step S113) is a relatively far, and the fact that the current pair having temporal continuity with the preceding pair is not present in the continuity determination processing (refer to Step S115). However, the embodiment is not limited thereto.

The statistical model in a case of the factor 5, the vehicle longitudinal multi-identification likelihood is "low", the upper object longitudinal multi-identification likelihood is "middle", and the score is "negative value". The score of the factor 5 is set to be a value larger than the score of the factor 2 in an absolute value, but the embodiment is not limited thereto. The score of the factor 5 may be a value equal to or smaller than the score of the factor 2.

Thus, when the extrapolation processing is performed on the target P2 in accordance with the factor the signal processing unit 201 according to the second embodiment calculates the score (negative value) indicating that the targets P1 and P2 are detected in longitudinal multi-identification of the standing vehicle with low possibility. Conversely, the signal processing unit 201 calculates the score (negative value) indicating that the targets P1 and P2 are detected in longitudinal multi-identification of the upper object with high possibility.

When the score is calculated based on the parameters A to D described above, the signal processing unit 201 according to the second embodiment calculates the cumulative score similarly to the first embodiment, and determines whether the "condition group B" is satisfied (refer to Step S147 in FIG. 14). If the condition group B is satisfied (Yes at Step S147), the signal processing unit 201 transfers the reliability of the target P2 to the target P1 (refer to Step S149).

Accordingly, the radar device 1 can determine classification of the target P1 used as a reference point of the vehicle control device 2 at an early stage.

In the second embodiment, by using the parameters A to D described above, for example, even when the upper object is the overhead bridge 100 (refer to FIG. 22) having unevenness on the lower surface side, it can be estimated that the targets P1 and P2 are detected in longitudinal multi-identification of the upper object with high possibility.

The signal processing unit 201 described above functions as a determination unit and a transfer unit. The target P1 is an example of a first target, and the target P2 is an example of a second target. The score is an example of a value indicating a possibility that the targets P1 and P2 are targets between which information related to classification of the target P2 is transferred as information related to classification of the target P1.

In the configuration of the first and second embodiments, the score is calculated using all of a plurality of statistical models. However, the embodiment is not limited thereto. The score may be calculated using some of the statistical models.

Other Embodiments

Each piece of processing in the above description performed by the processor 17 may be implemented by causing the processor 17 to execute a computer program corresponding to each piece of processing. For example, the computer program corresponding to each piece of processing in the above description may be stored in the memory 18, and each computer program may be read out from the memory 18 by the processor 17 to be executed. Each computer program is not necessarily stored in the memory 18 in advance. That is, for example, each computer program may be recorded in advance in a portable recording medium such as a magnetic disc, an optical disc, an IC card, and a memory card that can be connected to the radar device 1, and each computer program may be read out from the recording medium by the processor 17 to be executed. Alternatively, for example, each computer program may be stored in a computer, a server, or the like connected to the radar device 1 wireless or wired manner via the Internet, a LAN, a wireless LAN, and the like, and each computer program may be read out by the processor 17 to be executed.

The above embodiments have been described, by way of example, assuming that the number of the transmission antennas of the radar device 1 is one, and the number of the reception antennas is three. However, the number of the transmission antennas may be multiple, and the number of the reception antennas may be four or more.

According to the disclosed aspect, classification of the target can be determined at an early stage.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A radar device for deriving information related to a target based on a reception signal that is acquired by receiving a reflected wave obtained when a transmission wave transmitted to a periphery of an own vehicle is reflected by an object present in the periphery, the reflected wave being potentially subject to multipath interference, the radar device comprising a processor configured to:
   determine whether a plurality of targets belongs to a same object; and
   transfer, when it is determined that the plurality of targets belongs to the same object, information related to a classification of a second target among the plurality of targets as information related to a classification of a first target among the plurality of targets when the first target is a target present at a closer position than the second target and the second target is a target derived earlier than the first target, the information related to the classification of the first target indicating a possibility of collision between the vehicle and the first target, the information related to the classification of the second target indicating a possibility of collision between the vehicle and the second target,
   wherein the processor is further configured to determine whether to transfer the information related to the classification of the second target as the information related to the classification of the first target by using a statistical model related to parameters of the plurality of targets.

2. The radar device according to claim 1, wherein the statistical model includes a plurality of statistical models, and
   the plurality of statistical models includes at least one of:
   a first statistical model using, as parameters, a longitudinal distance difference indicating a distance difference in a traveling direction of the own vehicle between the first target and the second target, and a transverse distance difference indicating a distance difference in a vehicle-width direction of the own vehicle between the first target and the second target;
   a second statistical model using, as a parameter, a reception power difference of the reflected wave between the first target and the second target; and
   a third statistical model using, as a parameter when a detection process for detecting the target is repeatedly performed, a factor of a case in which an extrapolation process is performed for predicting a virtual position of the target that is not detected in a current detection process based on a past position of the target.

3. The radar device according to claim 2, wherein the processor is further configured to:
  calculate a score, which indicates a possibility that the first target and the second target are targets between which the information related to the classification of the second target is transferred as the information related to the classification of the first target, based on each of the first, the second, and the third statistical models; and
  when a cumulative score obtained by accumulating calculated scores is equal to or larger than a predetermined threshold, determine to transfer the information related to the classification of the second target as the information related to the classification of the first target.

4. The radar device according to claim 3, wherein, in the first statistical model, the score in a case in which the longitudinal distance difference and the transverse distance difference are within respective predetermined distance difference ranges is set to be higher than the score in a case in which at least one of the longitudinal distance difference and the transverse distance difference is outside the predetermined distance difference range(s).

5. The radar device according to claim 4, wherein, in the third statistical model, the score is set to be a positive value in a case of an extrapolation process caused by a factor that the first target is detected and the second target is not detected in the current detection process, and that the first target is within a predicted range including the predicted virtual position of the second target in both of a rising zone in which a frequency of the transmission wave rises and a lowering zone in which the frequency of the transmission wave lowers.

6. The radar device according to claim 5, wherein, in the third statistical model, the score is set to be a negative value in a case of an extrapolation process caused by a factor that the first target is detected and the second target is not detected in the current detection process, and that the first target is outside the predicted range including the predicted virtual position of the second target in both of the rising zone in which the frequency of the transmission wave rises and the lowering zone in which the frequency of the transmission wave lowers.

7. The radar device according to claim 5, wherein, in the third statistical model, the score is set to be a positive value in a case of an extrapolation process caused by a factor that: (a) the first target is detected and the second target is not detected in the current detection process; (b) the first target is within the predicted range including the predicted virtual position of the second target in one of the rising zone in which the frequency of the transmission wave rises and the lowering zone in which the frequency of the transmission wave lowers; and (c) the first target is outside the predicted range in another of the rising zone and the lowering zone.

8. The radar device according to claim 5, wherein, in the third statistical model, the score is set to be zero in a case of an extrapolation process caused by a factor that the first target and the second target are detected in one of the rising zone in which the frequency of the transmission wave rises and the lowering zone in which the frequency of the transmission wave lowers, and that the first target is detected and the second target is not detected in another of the rising zone and the lowering zone.

9. The radar device according to claim 4, wherein, in the third statistical model, the score is set to be a negative value in a case of an extrapolation process caused by a factor that the first target is detected and the second target is not detected in the current detection process, and that the first target is outside a predicted range including the predicted virtual position of the second target in both of a rising zone in which a frequency of the transmission wave rises and a lowering zone in which the frequency of the transmission wave lowers.

10. The radar device according to claim 4, wherein, in the third statistical model, the score is set to be a positive value in a case of an extrapolation process caused by a factor that: (a) the first target is detected and the second target is not detected in the current detection process; (b) the first target is within a predicted range including the predicted virtual position of the second target in one of a rising zone in which a frequency of the transmission wave rises and a lowering zone in which the frequency of the transmission wave lowers; and (c) the first target is outside the predicted range in another of the rising zone and the lowering zone.

11. The radar device according to claim 4, wherein, in the third statistical model, the score is set to be zero in a case of an extrapolation process caused by a factor that the first target and the second target are detected in one of a rising zone in which a frequency of the transmission wave rises and a lowering zone in which the frequency of the transmission wave lowers, and that the first target is detected and the second target is not detected in another of the rising zone and the lowering zone.

12. The radar device according to claim 3, wherein, in the third statistical model, the score is set to be a positive value in a case of an extrapolation process caused by a factor that the first target is detected and the second target is not detected in the current detection process, and that the first target is within a predicted range including the predicted virtual position of the second target in both of a rising zone in which a frequency of the transmission wave rises and a lowering zone in which the frequency of the transmission wave lowers.

13. The radar device according to claim 12, wherein, in the third statistical model, the score is set to be a negative value in a case of an extrapolation process caused by a factor that the first target is detected and the second target is not detected in the current detection process, and that the first target is outside the predicted range including the predicted virtual position of the second target in both of the rising zone in which the frequency of the transmission wave rises and the lowering zone in which the frequency of the transmission wave lowers.

14. The radar device according to claim 12, wherein, in the third statistical model, the score is set to be a positive value in a case of an extrapolation process caused by a factor that: (a) the first target is detected and the second target is not detected in the current detection process; (b) the first target is within the predicted range including the predicted virtual position of the second target in one of the rising zone in which the frequency of the transmission wave rises and the lowering zone in which the frequency of the transmission wave lowers; and (c) the first target is outside the predicted range in another of the rising zone and the lowering zone.

15. The radar device according to claim 12, wherein, in the third statistical model, the score is set to be zero in a case of an extrapolation process caused by a factor that the first target and the second target are detected in one of the rising zone in which the frequency of the transmission wave rises and the lowering zone in which the frequency of the transmission wave lowers, and that the first target is detected and the second target is not detected in another of the rising zone and the lowering zone.

16. The radar device according to claim 3, wherein, in the third statistical model, the score is set to be a negative value in a case of an extrapolation process caused by a factor that the first target is detected and the second target is not detected in the current detection process, and that the first target is outside a predicted range including the predicted virtual position of the second target in both of a rising zone in which a frequency of the transmission wave rises and a lowering zone in which the frequency of the transmission wave lowers.

17. The radar device according to claim 3, wherein, in the third statistical model, the score is set to be a positive value in a case of an extrapolation process caused by a factor that: (a) the first target is detected and the second target is not detected in the current detection process; (b) the first target is within a predicted range including the predicted virtual position of the second target in one of a rising zone in which a frequency of the transmission wave rises and a lowering zone in which the frequency of the transmission wave lowers; and (c) the first target is outside the predicted range in another of the rising zone and the lowering zone.

18. The radar device according to claim 3, wherein, in the third statistical model, the score is set to be zero in a case of an extrapolation process caused by a factor that the first target and the second target are detected in one of a rising zone in which a frequency of the transmission wave rises and a lowering zone in which the frequency of the transmission wave lowers, and that the first target is detected and the second target is not detected in another of the rising zone and the lowering zone.

19. An information transfer method for a radar device for deriving information related to a target based on a reception signal that is acquired by receiving a reflected wave obtained when a transmission wave transmitted to a periphery of an own vehicle is reflected by an object present in the periphery, the reflected wave being potentially subject to multipath interference, the information transfer method comprising:
  determining whether a plurality of targets belongs to a same object; and
  transferring, when it is determined that the plurality of targets belongs to the same object, information related to a classification of a second target among the plurality of targets as information related to a classification of a first target among the plurality of targets when the first target is a target present at a closer position than the second target and the second target is a target derived earlier than the first target, the information related to the classification of the first target indicating a possibility of collision between the vehicle and the first target, the information related to the classification of the second target indicating a possibility of collision between the vehicle and the second target,
  wherein whether to transfer the information related to the classification of the second target as the information related to the classification of the first target is determined by using a statistical model related to parameters of the plurality of targets.

* * * * *